US012792421B2

(12) United States Patent
Stichhaller et al.

(10) Patent No.: US 12,792,421 B2
(45) Date of Patent: Nov. 10, 2026

(54) AUTOMATED TAGGING OF RESOURCES BASED ON UTILIZATION

(71) Applicant: International Business Machines Corporation, Armonk, NY (US)

(72) Inventors: Luke Anthony Stichhaller, Ajax (CA); Luisa Fernanda Rojas Garcia, Ottawa (CA); George Alexandris, Toronto (CA); Talha Zia, Toronto (CA); Iosif Viorel Onut, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 18/772,410

(22) Filed: Jul. 15, 2024

(65) Prior Publication Data

US 2026/0017114 A1 Jan. 15, 2026

(51) Int. Cl.
*G06F 9/50* (2006.01)
*G06F 11/34* (2006.01)

(52) U.S. Cl.
CPC .......... *G06F 9/5072* (2013.01); *G06F 9/5033* (2013.01); *G06F 11/3447* (2013.01)

(58) Field of Classification Search
None
See application file for complete search history.

(56) References Cited

U.S. PATENT DOCUMENTS

D33,964 S 1/1901 Frank
7,921,200 B2 * 4/2011 Dieberger ............... H04L 43/00 709/224
8,667,497 B2 * 3/2014 Ripberger ............. G06F 3/0605 718/104
8,819,351 B2 * 8/2014 Ripberger ........... G06F 11/2066 711/152
8,990,398 B1 * 3/2015 Thrane ................ H04L 67/1001 709/226
9,118,538 B1 * 8/2015 Lekkalapudi ......... H04L 67/025
9,218,616 B2 12/2015 Biljon et al.
9,444,820 B2 9/2016 Muppidi et al.
9,491,112 B1 * 11/2016 Patel .................. G06F 9/45558
9,531,607 B1 * 12/2016 Pai ...................... H04L 41/5025
(Continued)

OTHER PUBLICATIONS

Xu et al. "On the Effectiveness of Collaborative Tagging Systems for Describing Resources", 2008 IEEE, pp. 467-471.*
(Continued)

*Primary Examiner* — Van H Nguyen
(74) *Attorney, Agent, or Firm* — CHIP LAW GROUP

(57) ABSTRACT

Automated resource tagging based on utilization relationships includes monitoring usage data associated with each of a plurality of resources and determining resource data associated with each of the plurality of resources based on the usage data. Based on the resource data, one or more utilization relationships for each of the plurality of resources are determined. Further, one or more clusters are generated based on the one or more utilization relationships and the resource data. Each of the one or more clusters includes at least one resource of the plurality of resources. Tag data for each of the plurality of resources is determined based on a corresponding cluster from the one or more clusters and the tag data for each of the plurality of resources is stored.

18 Claims, 10 Drawing Sheets

(56) References Cited

U.S. PATENT DOCUMENTS

| | | | | |
|---|---|---|---|---|
| 9,934,269 | B1 * | 4/2018 | Kahrs | G06F 16/9535 |
| 10,031,932 | B2 * | 7/2018 | Falkenberg | G06F 16/951 |
| 10,339,161 | B2 | 7/2019 | Boyle et al. | |
| 10,491,662 | B2 | 11/2019 | Srikanth et al. | |
| 10,496,692 | B1 * | 12/2019 | Kahrs | G06F 16/355 |
| 10,972,567 | B2 | 4/2021 | Luo et al. | |
| 11,290,527 | B2 | 3/2022 | Martinez et al. | |
| 11,544,230 | B2 | 1/2023 | Keller et al. | |
| 11,977,711 | B1 * | 5/2024 | Kahrs | G06F 16/35 |
| 2024/0073218 | A1 | 2/2024 | Ghalaty et al. | |

OTHER PUBLICATIONS

Katakis et al. "Automated Tagging for the Retrieval of Software Resources in Grid and Cloud Infrastructures", 2012 IEEE, pp. 628-635.*

Serhiienko et al. "Extensible Declarative Management of Cloud Resources across Providers", 2019 IEEE, pp. 678-683.*

"Using projects for IaC deployments", Running secure enterprise workloads, Product guide, 7 pages, Jul. 2023.

Esposito et al., "Towards an Ontology-Based Intercloud Resource Catalogue", The IEEE P2302 Intercloud Approach for a Semantic Resource Exchange, 8 Pages, Mar. 2015.

Nagesh Singh Chauhan, "DBSCAN Clustering Algorithm in Machine Learning", 10 Pages, Apr. 2022.

Nagesh Singh Chauhan, "What is Hierarchical Clustering?", 9 Pages, Sep. 2019.

* cited by examiner

AUTOMATED TAGGING OF RESOURCES BASED ON UTILIZATION

BACKGROUND

The present disclosure relates to resource tagging and, more particularly, to automated resource tagging for efficient management of resources.

Cloud computing has become a key component of modern IT strategies, offering scalable and on-demand access to resources. Cloud service providers offer a wide range of scalable resources, including virtual machines, storage solutions, and networking capabilities, allowing users to dynamically utilize the resources based on their needs. As organizations increasingly adopt cloud technologies, efficient management of these cloud resources has become a critical aspect of cloud operations.

Typically, platforms and applications developed and/or deployed using cloud resources may use multiple accounts with one or more cloud providers to support their services effectively. These accounts may provide, for example, infrastructure, storage, and computing power required to run the platforms and applications. To optimize costs, organizations often share cloud accounts and cloud resources among different teams.

SUMMARY

According to an embodiment of the present disclosure, a computer-implemented method for automated tagging of resources is described. The computer-implemented method includes monitoring, by a computer, usage data associated with each of a plurality of resources. The computer-implemented method further includes determining, by the computer, resource data associated with each of the plurality of resources based on the usage data. The computer-implemented method further includes determining, by the computer, one or more utilization relationships for each of the plurality of resources based on the resource data. The computer-implemented method further includes generating, by the computer, one or more clusters based on the one or more utilization relationships and the resource data. In this regard, each of the one or more clusters comprises at least one resource of the plurality of resources. The computer-implemented method further includes determining, by the computer, tag data for each of the plurality of resources based on a corresponding cluster from the one or more clusters. The computer-implemented method further includes storing, by the computer, the tag data for each of the plurality of resources.

According to an embodiment of the present disclosure, a system for automated tagging of resources is described. The system comprises a processor set configured to monitor usage data associated with each of a plurality of resources. Further, the processor set is configured to determine resource data associated with each of the plurality of resources based on the usage data. The processor set is further configured to determine one or more utilization relationships for each of the plurality of resources based on a utilization of each of the plurality of resources by a calling entity. The calling entity is at least one of: a calling resource, or a user. The processor set is further configured to generate one or more clusters based on the one or more utilization relationships and the resource data. In this regard, each of the one or more clusters comprises at least one resource of the plurality of resources. The processor set is further configured to determine tag data for each of the plurality of resources based on a corresponding cluster from the one or more clusters. The processor set is further configured to store the tag data for each of the plurality of resources.

According to an embodiment of the present disclosure, a computer program product for automated tagging of resources is described. The computer program product comprises a computer-readable storage medium having program instructions embodied therewith. The program instructions are executable by a system to cause the system to monitor usage data associated with each of a plurality of resources. The system is further configured to determine resource data associated with each of the plurality of resources based on the usage data. The system is further configured to determine one or more utilization relationships for each of the plurality of resources based on a utilization of each of the plurality of resources by a calling entity. The calling entity is at least one of: a calling resource, or a user. The system is further configured to generate one or more clusters based on the one or more utilization relationships and the resource data. In this regard, each of the one or more clusters comprises at least one resource of the plurality of resources. The system is further configured to determine tag data for each of the plurality of resources based on a corresponding cluster from the one or more clusters. The system is further configured to store the tag data for each of the plurality of resources.

According to an embodiment of the present disclosure, an application of the computer-implemented method, the system, and the computer program product in computing environments in which a plurality of resources is utilized in a shared manner is described. In this regard, one or more utilization relationships and resource data of each of the plurality of resources are used to determine corresponding tag data. Further, the tag data may be used to automatically assign a tag to each of the plurality of resources. The automated tagging of each of the plurality of resources may allow resource tracking, cost allocation, and policy enforcement within an organization.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein.

DETAILED DESCRIPTION

Figure 1:
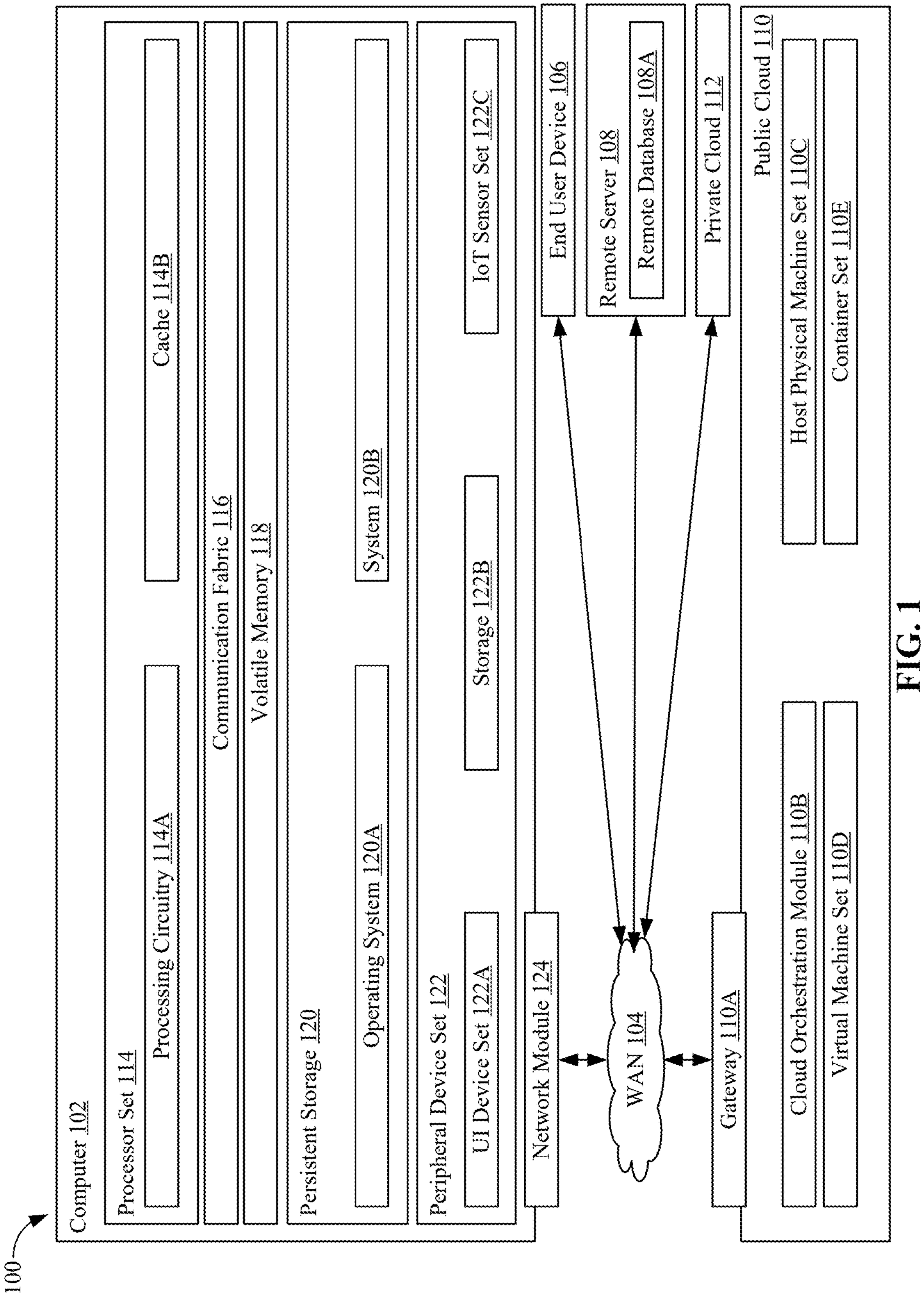
FIG. 1 is a diagram that illustrates a computing environment for automated tagging of resources, in accordance with an embodiment of the disclosure.

According to an aspect of the present disclosure, there is provided a computer-implemented method for automated tagging of resources. The computer-implemented method includes monitoring, by a computer, usage data associated with each of a plurality of resources. The computer-implemented method further includes determining, by the computer, resource data associated with each of the plurality of resources based on the usage data. The computer-implemented method further includes determining, by the computer, one or more utilization relationships for each of the plurality of resources based on the resource data. The computer-implemented method further includes generating, by the computer, one or more clusters based on the one or more utilization relationships and the resource data. In this regard, each of the one or more clusters comprises at least one resource of the plurality of resources. The computer-implemented method further includes determining, by the computer, tag data for each of the plurality of resources based on a corresponding cluster from the one or more clusters. The computer-implemented method further includes storing, by the computer, the tag data for each of the plurality of resources. By using the utilization relationships between a resource and other entity, such as another resource or a user, the plurality of resources are clustered. For example, each of the one or more clusters may include resources that may be associated with the same service, team or member. Subsequently, tag data for each of the resources in a cluster is determined based on the same or common service, team, or member for each of the resources. In this manner, the tagging process for the resources is automated. By automating the tagging process, the need for manual intervention may be eliminated or substantially reduced, thereby saving significant time and effort of administrators. Moreover, automated tagging may be scaled with the dynamic nature of resource utilization, handling the rapid provisioning and deprovisioning of resources without or with limited human intervention.

In particular, the utilization relationships indicate a manner in which each of the plurality of resources is used. The utilization relationships are used to determine how resources may be grouped or clustered so that each cluster is assigned the same tag. As the plurality of resources are tagged accurately to indicate which service or team is using the resources, precise tracking of the usage of the plurality of resources by different teams, services, user, and/or projects is enabled. This facilitates accurate cost allocation and budgeting. This may further lead to resource optimization and cost savings.

In an embodiment, the usage data of each of the plurality of resources comprises information associated with at least one of creation of each of the plurality of resources, modification of each of the plurality of resources, or deletion of each of the plurality of resources. The usage data associated with each of the plurality of resources is monitored to determine any change in utilization of the resources. The usage data indicates the creation of a new resource, and modification or deletion of existing resources. Subsequently, the tag data for the resources is generated or updated based on any change in the usage data. This ensures dynamic accurate tagging of resources in automated manner, thereby reducing the manual time and effort required to update tags of resources.

In an embodiment, the computer-implemented method further includes assigning, by the computer, a service tag to each of the plurality of resources based on the corresponding tag data of each of the plurality of resources. A service tag assigned to a resource indicates a label for the resource. This provides a comprehensive and real-time view of resource allocation across different services, teams, and/or users in an organization, enhancing visibility and oversight. Moreover, the service tag assigned to each of the plurality of resources may simplify the management of the resources, such as by automating routine tasks or service-based tasks.

In an embodiment, the computer-implemented method further includes detecting, by the computer, a change in the usage data of a resource of the plurality of resources based on the monitoring. The computer-implemented method further includes determining, by the computer, updated tag data associated with the resource based on the change. By monitoring changes in usage data of the resources and updating tag data in case of any identified change, service tags assigned to the resources may reflect the most recent status and attributes of the resources. This may maintain accuracy in the assigned service tags without delay. Moreover, updating the service tags assigned to the resources may enable precise tracking of usage of the resources by different services, teams, or projects, thereby helping in accurate cost allocation, budgeting, and reducing wastage.

In an embodiment, the computer-implemented method further includes determining, by the computer, the one or more utilization relationships for a resource from the plurality of resources based on a utilization of the resource by a calling entity. The calling entity is at least one of a calling resource or a user. The utilization relationships indicate relationships between each of the plurality of resources and the calling entity that accesses it. For example, the plurality of resources may be accessed by another resource or a user. Such utilization relationship of each of the plurality of resources is monitored and analyzed to accurately determine a service or a team to which the resources are mapped or used in. This helps in identifying resource consumption of different teams in an organization. Moreover, the monitoring and analysis of the utilization relationships of each of the plurality of resources may also be used to identify underutilized or unused resources, enabling their reallocation, or decommissioning to optimize costs. Further, the monitoring and analysis of the utilization relationships of each of the plurality of resources helps in tracking which of the resources belong to different services. This enables to accurately allocate or determine costs associated with resource consumption for different teams in the organization.

In an embodiment, plurality of datapoints corresponding to the plurality of resources based on the one or more utilization relationships and the resource data. The computer-implemented method further includes generating, by the computer, the one or more clusters using a first model. The first model is configured to partition the plurality of datapoints into the one or more clusters. In an example, the first model is a machine-learning (ML) model that is trained to partition datapoints. Using the ML model, the clustering of the plurality of datapoints corresponding to the plurality of resources may be performed in an automated manner. The ML model may handle high-dimensional data effectively to group similar datapoints even when the data has many features. Moreover, automated clustering minimizes the risk of human error, ensuring more consistent and reliable results.

In an embodiment, the computer-implemented method further includes generating, by the computer, a multi-dimensional embedding for each of the plurality of resources based on the one or more utilization relationships and the resource data. The computer-implemented method further includes generating, by the computer, the one or more clusters based on features of the multi-dimensional embedding for each of the plurality of resources. In certain cases, the plurality of datapoints corresponding to the plurality of resources may be generated based on multi-dimensional embeddings. Multi-dimensional embeddings may transform high-dimensional data associated with the plurality of resources into a lower-dimensional space, preserving patterns and structures. This transformation reduces the complexity of data, making it more manageable and suitable for clustering algorithms to cluster the multi-dimensional embeddings of the plurality of resources.

In an embodiment, the computer-implemented method further includes determining, by the computer, an assigned service tag of the at least one resource of the plurality of resources in a cluster of the one or more clusters based on the resource data. The computer-implemented method further includes determining, by the computer, the tag data for each of one or more remaining resources of the plurality of resources of the cluster based on the assigned service tag. In certain cases, a service tag is already assigned to a resource of a cluster. Such assigned service tags are used to assign service tags to other resources in the cluster. This enables quick and accurate tagging of the resources as all the resources in the cluster are tagged based on the same assigned service tag. This may ensure that the resources are tagged in accordance with pre-defined service tags set by user(s), aiding in reporting and management. Automatically tagging the remining resources of the cluster with the assigned service tag may also facilitate the enforcement of predefined rules and criteria that are associated with the assigned service tag.

In an embodiment, the resource data for a resource of the plurality of resources comprise at least one of one or more user identifiers, user access data, one or more resource identifiers, Application programming interface (API) call data, creation data, modification data, name data, assigned service tag data, group data, or hierarchy data. The resource data for each of the plurality of resources is analyzed to determine the one or more utilization relationships for the plurality of resources for automated tagging.

In an embodiment, each of the plurality of resources is a cloud resource, and wherein the plurality of resources comprises at least one of a compute resource, a storage resource, a networking resource, or a database resource. The embodiments of the present disclosure provide techniques for automated tagging of cloud resources. Assigning a service tag to the cloud resources may enhance resource management, cost optimization, security, and operational efficiency within a cloud environment of an organization.

According to an aspect of the present disclosure, there is provided a system for automated resource tagging. The system includes a processor set configured to monitor usage data associated with each of a plurality of resources. The processor set is further configured to determine resource data associated with each of the plurality of resources based on the usage data. The processor set is further configured to determine one or more utilization relationships for each of the plurality of resources based on a utilization of each of the plurality of resources by a calling entity. In an example, the calling entity is at least one of a calling resource or a user. The processor set is further configured to generate one or more clusters based on the one or more utilization relationships and the resource data. Each of the one or more clusters may include at least one resource of the plurality of resources. The processor set is further configured to determine tag data for each of the plurality of resources based on a corresponding cluster from the one or more clusters. The processor set is further configured to store the tag data for each of the plurality of resources.

In an embodiment, the usage data of each of the plurality of resources comprises information associated with at least one of creation of each of the plurality of resources, modification of each of the plurality of resources, or deletion of each of the plurality of resources.

In an embodiment, the processor set is further configured to assign a service tag to each of the plurality of resources based on the corresponding tag data of each of the plurality of resources.

In an embodiment, the processor set is further configured to detect a change in the usage data of a resource of the plurality of resources based on the usage data. The processor set is further configured to determine updated tag data associated with the resource based on the change.

In an embodiment, the processor set is further configured to generate a plurality of datapoints corresponding to the plurality of resources based on the one or more utilization relationships and the resource data. The processor set is further configured to generate the one or more clusters using a first model. The first model is configured to partition the plurality of datapoints into the one or more clusters.

In an embodiment, the processor set is further configured to generate a multi-dimensional embedding for each of the plurality of resources based on the one or more utilization relationships and the resource data. The processor set is further configured to generate the one or more clusters based on features of the multi-dimensional embedding for each of the plurality of resources.

In an embodiment, the processor set is further configured to determine an assigned service tag of the at least one resource of the plurality of resources in a cluster of the one or more clusters based on the resource data. The processor set is further configured to determine the tag data for each of one or more remaining resources of the plurality of resources of the cluster based on the assigned service tag.

In an embodiment, the resource data for a resource of the plurality of resources comprise at least one of: one or more user identifiers, user access data, one or more resource identifiers, Application programming interface (API) call data, creation data, modification data, name data, existing assigned service tag data, group data, and or hierarchy data.

In an embodiment, each of the plurality of resources is a cloud resource, and wherein the plurality of resources comprises at least one of a compute resource, a storage resource, a networking resource, a database resource, or software application.

According to an aspect of the present disclosure, there is provided a computer program product for automated resource tagging. The computer program product includes a computer-readable storage medium having program instructions embodied therewith, the program instructions executable by a processor set to cause the processor set to monitor usage data associated with each of a plurality of resources. The processor set is further configured to determine resource data associated with each of the plurality of resources based on the usage data. The processor set is further configured to determine one or more utilization relationships for each of the plurality of resources based on a utilization of each of the plurality of resources by a calling entity. In an example, the calling entity is at least one of a calling resource or a user. The processor set is further configured to generate one or more clusters based on the one or more utilization relationships and the resource data. Each of the one or more clusters includes at least one resource of the plurality of resources. The processor set is further configured to determine tag data for each of the plurality of resources based on a corresponding cluster from the one or more clusters. The processor set is further configured to store the tag data for each of the plurality of resources.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment 100 for automated resource tagging based on one or more utilization relationships of each of a plurality of resources, in accordance with an embodiment of the disclosure. With reference to FIG. 1, there is shown the computing environment 100 that contains an example of an environment for the execution of at least some of the computer code involved in performing the inventive methods, such as a system 120B that generates tag data for automated tagging of the plurality of resources in a computing environment, such as a cloud environment. In addition to the system 120B, the computing environment 100 includes, for example, a computer 102, a wide area network (WAN) 104, an end user device (EUD) 106, a remote server 108, a public cloud 110, and a private cloud 112. According to the present embodiment, the computer 102 includes a processor set 114 (including a processing circuitry 114A and a cache 114B), a communication fabric 116, a volatile memory 118, a persistent storage 120 (including an operating system 120A and the system 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network, or querying a database, such as a remote database 130. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as the cache 114B and the other storage media discussed below. The program instructions, and associated data, are accessed by the processor set 114 to control and direct performance of the inventive methods. In the computing environment 100, at least some of the instructions for performing the inventive methods may be stored in the system 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The Volatile Memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the system 120B typically includes at least some of the computer code involved in performing the inventive methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments, storage 122B may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing large amounts of data, such as a storage area network (SAN) that is shared by multiple, geographically distributed computers. The IoT sensor set 122C is made up of sensors that can be used in Internet of Things applications. For example, one sensor may be a thermometer and another sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In an embodiment, network control functions, and network forwarding functions of the network module 124 are performed on the same physical hardware device. In another embodiment (for example, embodiments that utilize software-defined networking (SDN)), the control functions and the forwarding functions of the network module 124 are performed on physically separate devices, such that the control functions manage several different network hardware devices. Computer-readable program instructions for performing the inventive methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In an embodiment, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The End User Device (EUD) 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present, the recommendation to an end user. In an embodiment, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 130 of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system may utilize all resources of that computer, such as connected devices, files and folders, network shares, CPU power, and quantifiable hardware capabilities. However, programs running inside a container may use the contents of the container and devices assigned to the container, a feature which is known as containerization.

The private cloud 112 is similar to public cloud 110, except that the computing resources are available for use by a single enterprise. While the private cloud 112 is depicted as being in communication with the WAN 104, in other embodiments, a private cloud may be disconnected from the internet entirely and accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 110 and the private cloud 112 are both part of a larger hybrid cloud.

Figure 2:
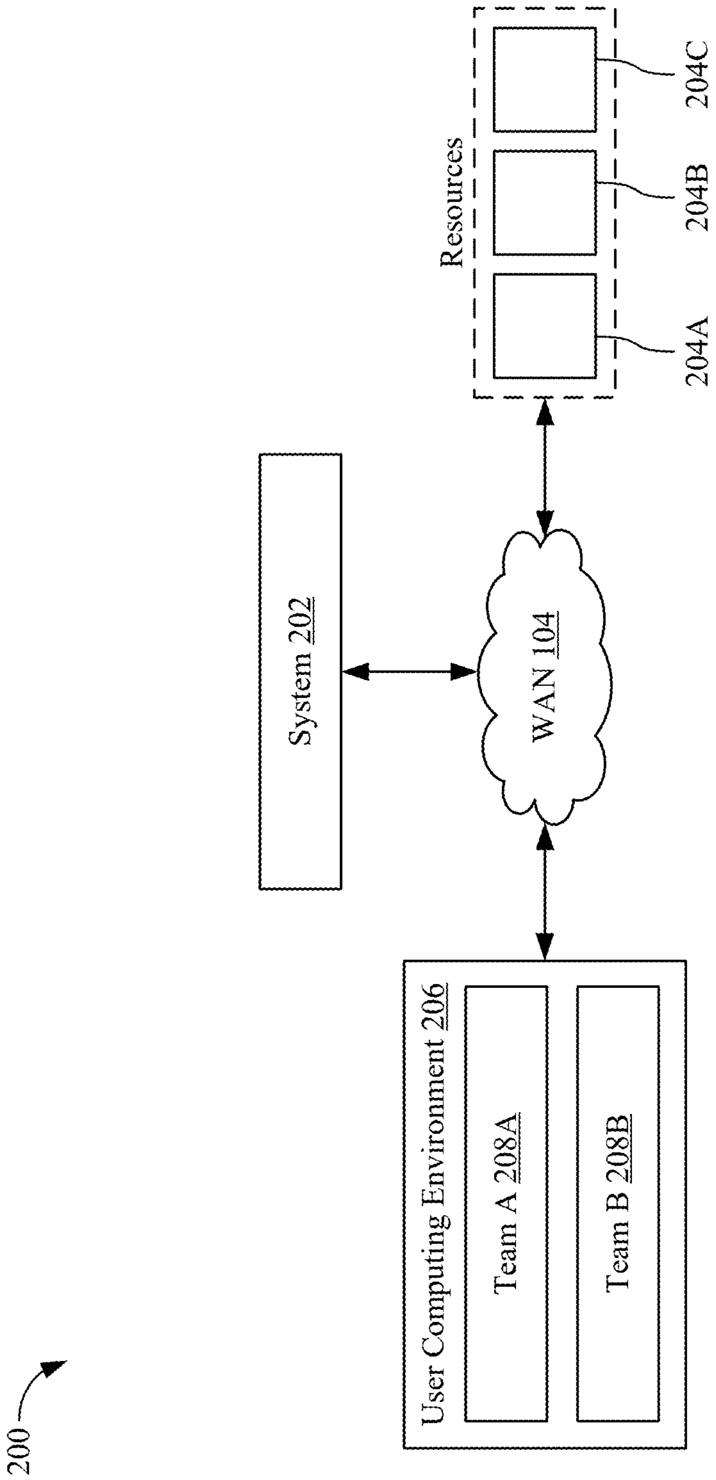
FIG. 2 is a diagram that illustrates a network environment in which a system for automated tagging of resources is implemented, in accordance with an embodiment of the disclosure.

FIG. 2 is a diagram that illustrates a network environment 200 in which a system 202 for automated resource tagging is implemented, in accordance with an embodiment of the disclosure. FIG. 2 is explained in conjunction with elements from FIG. 1. The network environment 200 includes the system 202, a user computing environment 206, and a plurality of resources (depicted as a resource 204A, a resource 204B and a resource 204C, and collectively referred to as resources 204). The network environment 200 further includes the WAN 104 of FIG. 1. In an embodiment, the system 202 may be an exemplary embodiment of the system 120B of FIG. 1.

The system 202 may include suitable logic, circuitry, interfaces, and/or code that is configured to perform decision making with respect to tagging of the resources 204. The system 202 is configured to determine tag data associated with each of the resources 204. The resources 204 may correspond to various components and assets that are utilized to perform computing tasks and services. The resources 204 may be physical compute resources and/or virtual compute resources and are utilized for the functioning, management, and optimization of IT infrastructure of a user or an organization. The resources 204 may be accessible to user(s) in the user computing environment 206 over the Internet. It may be noted that such an illustration of the resources 204 to be accessible over the Internet is only exemplary and should not be construed as a limitation. In an embodiment, the resources 204 may be co-located within the user computing environment 206. To this end, user devices associated with one or more users within the user computing environment 206 may access the resources 204 to perform certain tasks and operations, such as to develop a service, facilitate operation of a service, and so forth.

In an example, the resources 204 are cloud resources. In this regard, the cloud resources are services, tools, and infrastructure components provided by cloud service providers that enable users to build, deploy, and manage applications and services over the Internet. The cloud resources may be offered on a pay-as-you-go basis, providing scalability, flexibility, and cost efficiency to users. Examples of the cloud resources include, but are not limited to, computer resources, storage resources, networking resources, database resources, or software applications. In particular, the cloud resources are accessible to the one or more users in the user computing environment 206 over the Internet.

In accordance with an embodiment, the user computing environment 206 may be an enterprise network or an organization's computing environment. To this end, the resources 204, that may be cloud resources, are accessed by different teams or individuals within the user computing environment 206. In an exemplary embodiment, the user computing environment 206 may include two teams, such as team A 208A and team B 208B (collectively referred to as teams 208). Each of the teams 208 is associated with a different service or product offering. However, the teams 208 may access the resources 204 through one or more share cloud accounts to optimize costs for supporting their services efficiently. This may enable pooling of the resources 204 and may lead to significant cost savings. It may be noted that the user computing environment 206 to have two teams is only exemplary and should not be construed as a limitation. In other examples, the user computing environment 206 may include a plurality of teams, such as three, four, five, six, ten, twenty, and so forth.

However, the shared use of the one or more cloud accounts introduces several management challenges. In particular, the shared use of the one or more cloud accounts cause difficulty in tracking and managing consumption of resources 204 by each of the teams 208 within the same one or more cloud accounts. As the resources 204 are provisioned and deprovisioned by the teams 208, maintaining an organized and synchronized overview of resource allocation becomes increasingly complex. This results in inefficiencies in operation associated with providing the services by the user computing environment 206. In certain cases, certain resources from the resources 204 may be underutilized or forgotten, thus driving up costs unnecessarily. In certain cases, account administrators, or team members may perform the task of managing the shared cloud resources. However, the task of managing shared resources may quickly become overwhelming and may be prone to errors. Owing to lack of a clear system to delineate which cloud resources are being used by which teams, accurately allocating costs, and enforcing accountability becomes problematic.

In certain other cases, one of the teams 208 may surpass their allocated resource consumption, which may potentially cause confusion and inaccuracies in determining cost of operation if such increase in resource consumption is not tracked properly. It may be noted that while the present example illustrates only two teams 208 associated with two different services of an organization, however, this is only exemplary. In most cases, the user computing environment 206 associated with the organization may include multiple, such as 10 or 20 different teams that may be further associated with different services. In certain cases, some teams also collaboratively work on a single service. Moreover, the resources 204 also include a large number of resources, such as cloud resources. These cloud resources may be provided by the same or different cloud service providers. Due to increasingly complex and dynamic nature of access of the resources 204 by the teams 208 in the user computing environment 206, the accurate and precise tracking of resource consumption and tagging of the resources 204 based on its consumption is crucial in ensuring efficient operation of an organization.

Traditionally, the management of cloud resources is performed manually. This manual process often involves tagging each resource with metadata that indicates ownership, usage, or other relevant attributes. For example, the cloud resources may be tagged to specify which team, department, or individual is responsible for or using each of the cloud resources. These tags facilitate resource tracking, cost allocation, and policy enforcement within an organization.

However, the manual tagging process is labor-intensive and prone to errors. As the number of resources 204 grows, maintaining accurate and up-to-date tags becomes increasingly challenging. Inconsistencies in tagging may lead to resource mismanagement, inefficiencies, and increased costs. Additionally, the manual nature of this process does not scale well with the dynamic and elastic nature of cloud environments, where resources are frequently provisioned and deprovisioned.

To address these challenges, the embodiments of the present disclosure provide the system 202 for automated tagging of the resources 204 for efficient management of these resources 204. The system 202 may reduce the dependency on manual tagging, minimize errors, and improve overall resource management. By automating the tagging and management processes, organizations, or the user computing environment 206 may achieve better control over their cloud environments, optimize resource utilization, and reduce operational costs.

The present disclosure also provides an automated method for managing the resources 204 used by a cloud user or a cloud tenant, e.g., the user computing environment 206. This method enables dynamic assignment and management of service tags to the resources 204, ensuring accurate and efficient resource management.

The system 202 is configured to monitor usage data associated with each of a plurality of resources, e.g., the resources 204. The system 202 is further configured to determine resource data associated with each of the plurality of resources 204 based on the usage data. The system 202 is further configured to determine one or more utilization relationships for each of the plurality of resources 204 based on a utilization of each of the plurality of resources by a calling entity. In an example, the calling entity is at least one of a calling resource or a user. The system 202 is further configured to generate one or more clusters based on the one or more utilization relationships. In this regard, each of the one or more clusters comprises at least one resource of the plurality of resources. The system 202 is further configured to determine tag data for each of the plurality of resources based on a corresponding cluster from the one or more clusters. The system 202 is further configured to store the tag data for each of the plurality of resources. Examples of the system 202 may include, but are not limited to, a computing device, a virtual computing device, a mainframe machine, a server, a computer workstation, a smartphone, a cellular phone, a mobile phone, a gaming device, a consumer electronic (CE) device and/or any other device with trace calculation capabilities.

The user computing environment 206 may include suitable logic, circuitry, and interfaces, and/or code that may be configured to enable various local and/or remote resources associated with an organization to access the resources 204, for example cloud resources in cloud environment. The user computing environment 206 may include the two teams 208 associated with the organization. The two teams may be working or providing different services. The user computing environment 206 is further configured to provide local connection to user devices associated with the teams 208 for operation thereof and store data generated by the user devices of the teams 208. The user computing environment 206 may be implemented as a server or a cloud server and may execute operations through web applications, cloud applications, HTTP requests, repository operations, file transfer, and the like. Other example implementations of the user computing environment 206 may include, but are not limited to, a database server, a file server, a web server, a media server, an application server, a mainframe server, or a cloud computing server.

In an embodiment, the user computing environment 206 is implemented as a plurality of distributed cloud-based resources by use of several technologies that are well known to those ordinarily skilled in the art. A person with ordinary skill in the art will understand that the scope of the disclosure may not be limited to the implementation of the user computing environment 206 and the system 202 as two separate entities. In certain cases, the functionalities of the user computing environment 206 can be incorporated in its entirety or at least partially in the system 202 or vice versa, without a departure from the scope of the disclosure.

In operation, the system 202 is configured to monitor usage data associated with each of the plurality of resources 204. In an example, the usage data refers to information generated and recorded when users or user devices associated with the teams 208 interact with the resources 204. The usage data may include information associated with activities such as the creation, manipulation (modification), and deletion of the resources 204. Further, monitoring the usage data may include tracking and analyzing these activities associated with a configuration of the resources 204.

The system 202 is further configured to determine resource data associated with each of the plurality of resources 204 based on the usage data. The resource data refers to detailed information about the resources 204 utilized within a cloud environment. The resource data may include data about configuration, status, performance, and usage of the resources 204. The resource data includes attributes of the resources 204 depending on a type of resource, such as compute instances, storage volumes, databases, and networking components. For example, for a compute resource, the resource data may include, for example, information associated with virtual machines or containers, including initiation user, instance type, size, operating system, configuration, central processing unit (CPU) usage, memory usage, and network throughput.

The system 202 is further configured to determine one or more utilization relationships for each of the plurality of resources 204 based on a utilization of each of the plurality of resources 204 by a calling entity. The calling entity is at least one of a calling resource or a user. In an example, the calling entity refers to a user, an application, a process, or a system that consumes, interacts with, or manages the resources 204. This may include human users, automated scripts, applications, other calling resources in the user computing environment 206, and other cloud services or resources.

In an example, the one or more utilization relationships for a resource, say the resource 204A, of the plurality of resources 204 may indicate a manner in which the calling entity may utilize the resource 204A. The one or more utilization relationships between the resource 204A and the calling entity may indicate allocation, access, usage, and management of the resource 204A by the calling entity. In certain cases, there may be more than one calling entity for a resource, e.g., multiple calling entities may be accessing and/or utilizing the resource. In an example, the one or more utilization relationships between the resource 204A and the calling entity corresponds to a relationship between the resource 204A and a user, for example, associated with the team A 208A. Moreover, in certain cases, more than one user, such as all users associated with the team A 208A accesses and/or use the resource 204A. In such a case, the one or more utilization relationships between the resource 204A and the calling entity corresponds to a relationship between the resource 204A and each of the different users associated with the team A 208A. In another example, the one or more utilization relationships between the resource 204A and the calling entity corresponds to a relationship between the resource 204A and a calling resource that may be local to or associated with the user computing environment 206. In yet another example, the one or more utilization relationships between the resource 204A and the calling entity may correspond to a relationship between the resource 204A and another cloud resource, say the resource 204B. The one or more utilization relationships between the resource 204A and the calling entity be a combination of the above-described relationships. To this end, the one or more utilization relationships between the resource 204A and its calling entity or calling entities may establish a link between user(s) and/or device(s) that may be accessing and/or using the resource 204A.

The system 202 is further configured to generate one or more clusters based on the one or more utilization relationships and the resource data. In an example, each of the one or more clusters comprises at least one resource of the plurality of resources. In an example, based on the one or more utilization relationships and the resource data of the resource 204A, the resource 204A is represented as a datapoint in a space. Similarly, each of the resources 204 is represented in a space, such as a multi-dimensional space for clustering. To this end, datapoints corresponding to a subset of the resources 204 that may be accessed and/or utilized by the same calling entity or same calling entities may be positioned close to each other in the multi-dimensional space. In this manner, a cluster may be generated corresponding to the subset of the resources 204. The cluster may include datapoints corresponding to the subset of the resources 204. For example, one or more utilization relationships may exist between the resource 204A and different users of the team A 208A, and the resource 204B and the different users of the team A 208A. Subsequently, based on the one or more utilization relationships and the resource data of the resources 204, datapoints corresponding to the resource 204A and the resource 204B may lie close to each other in the multi-dimensional space. As a result, a cluster including the datapoints corresponding to the resource 204A and the resource 204B is generated. This cluster may indicate that utilization and/or access of the resource 204A and the resource 204B is done by the same calling entity or same set of calling entities. As a result, the resource 204A and the resource 204B may be likely used for performing operations associated with the same service. In this manner, the one or more clusters may be generated.

The system 202 is further configured to determine tag data for each of the plurality of resources 204 based on a corresponding cluster from the one or more clusters. For example, the system 202 may determine the tag data for the resource 204A and the resource 204B based on a close association of the resource 204A and the resource 204B with the team A 208A and/or a service associated with the Team A 208A. In an example, the system 202 may be configured to randomly determine tag data for the resource 204A and the resource 204B, such that the tag data is associated with the team A 208A and/or a service associated with the Team A 208A. in another example, the system 202 may be configured to determine the tag data for the resource 204A and the resource 204B based on any existing or an already assigned service tag for any one of the resource 204A and the resource 204B. In an example, the tag data may include metadata in the form of key-value pairs to be assigned to the resources 204 within a cloud environment. Subsequently, based on utilization of each of the resources 204, corresponding tag data is determined. For example, the tag data of the resources 204 may include a user ID, a team name, a task name, or a combination thereof. In an example, the tag data may be generated as <123>, wherein "123" is a user ID of a user accessing or utilizing the resources 204. In another example, the tag data may be generated as <123, product team ABC>, wherein "123" is the user ID of the user accessing or utilizing the resources 204 and "product team ABC" indicates a team ID of a team associated with the user and/or a team accessing or utilizing the resources 204. In an example, the tag data may be generated as <application XYZ>, wherein "application XYZ" indicates an application or a task for which the resources 204 are accessed or utilized.

Further, the system 202 may be configured to store the tag data for each of the plurality of resources 204. For example, the tag data for the resource 204A and the resource 204B may be stored in association with the resource 204A and the resource 204B. In this manner, a service tag may be assigned to the resource 204A and the resource 204B. Similarly, tag data for each of the resources 204 may be stored in a database, such as in conjunction with the corresponding resource from the resources 204 for efficient resource management, cost optimization, security, and operational efficiency of the resources 204 or the cloud resources associated with the user computing environment 206.

Examples of the resources 204 may include, but are not limited to, one or more compute resources (such as, graphic processing units (GPUs), and central processing units (CPUs) virtual machines, containers and servers), one or more memory resources (such as hard disk drives (HDD), sold state drives (SSD), etc.), random access memory (RAM), solid state drive cache, etc.), one or more network resources (such as network devices, network bandwidth, etc.), or one or more database resources (such as structured query language (SQL) databases, NoSQL databases, etc.).

Figure 3:
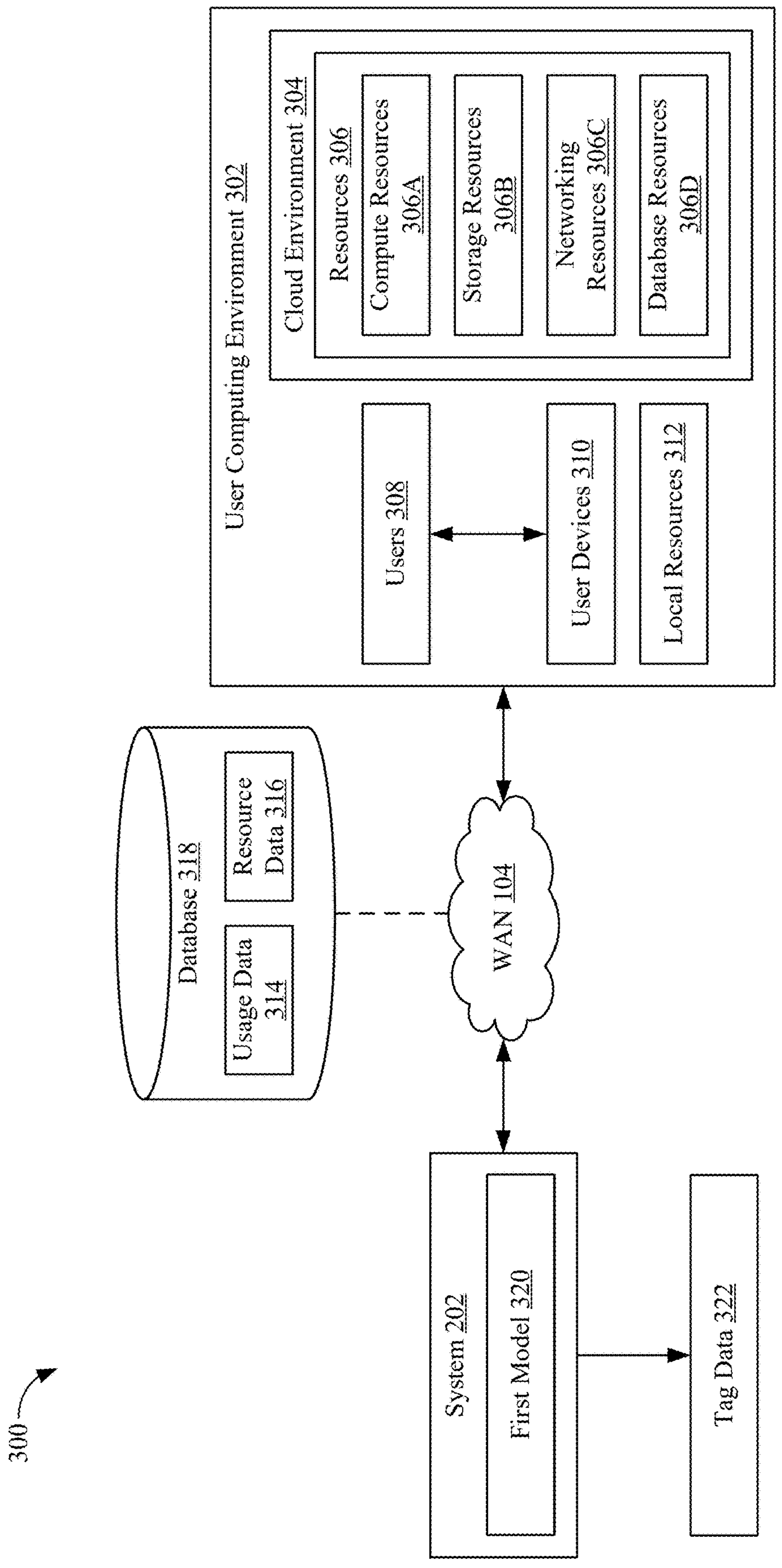
FIG. 3 is a schematic illustration of a network environment in which the system for automated tagging of resources is implemented, in accordance with an embodiment of the disclosure.

FIG. 3 is a schematic illustration of a network environment 300 in which the system 202 for automated tagging of resources can be implemented, in accordance with an embodiment of the disclosure. FIG. 3 is described in conjunction with FIG. 2. The network environment 300 includes the system 202, a user computing environment 302, and a database 318. The network environment 200 may further include the WAN 104 of FIG. 1. In an embodiment, the network environment 300 may be an exemplary embodiment of the network environment 200 of FIG. 2. In an embodiment, the user computing environment 302 may be an exemplary embodiment of the user computing environment 206 of FIG. 2.

In an exemplary embodiment, the user computing environment 302 may include a cloud environment 304. It may be noted that including the cloud environment 304 within the user computing environment 302 is only illustrative and should not be construed as a limitation. In particular, the user computing environment 302 may be connected to the cloud environment 304, such as via the Internet. The cloud environment 304 may provide infrastructure, platforms, and services provided by a cloud computing provider that enable organizations and individuals to deploy, manage, and scale the resources 306, such as applications, data storage, and computing resources over the internet. Moreover, the user computing environment 302 refers to a computing environment of an organization or an individual utilizing the resources 306 provided by the cloud environment 304. The cloud environment 304 may vary based on deployment models, service models, and specific technologies used. The cloud environment 304 enables users to provision and manage the resources 306 without requiring human interaction with a service provider. The resources 306 utilized by the user computing environment 302 may be elastically provisioned and released to scale rapidly outward and inward commensurate with demand. For example, the cloud environment 304 may be a private cloud, a public cloud, a hybrid cloud, or a multi-cloud. Moreover, the cloud environment 304 may operate on any of the service models, such as Infrastructure as a Service (IaaS), Platform as a Service (PaaS), Software as a Service (SaaS), or Container as a Service (CaaS).

In an embodiment, the cloud environment 304 may provide a plurality of resources that may be used by users in the user computing environment 302. Examples of these resources may include, but are not limited to, compute resources 306A, storage resources 306B, networking resources 306C, and database resources 306D. In an example, the compute resources 306A may include virtual machines, containers, CPUs, GPUs, and serverless computing that provide the computing power. Further, the storage resources 306B may provide infrastructure for storing data, such as object storage, block storage, and file storage. The networking resources 306C may provide infrastructure for virtual networks, load balancers, virtual private networks (VPNs), and other networking services that connect the resources 306 and/or other resources in the user computing environment 302 and ensure reliable data transmission. Moreover, the database resources 306D may include managed database services for structured (SQL) and unstructured (NoSQL) data. In certain cases, the resources 306 provided by the cloud environment 304 may also include security resources (such as, tools and services for securing data and applications, encryption tools, and threat detection tools, etc.), and management and monitoring resources (such as services for managing and monitoring cloud resources, and analytics services). While the present disclosure illustrates that the resources 306 are provided by the cloud environment 304, this should not be construed as a limitation. In an embodiment, the resources 306 utilized in the user computing environment 302 may be provided by one or more cloud computing providers, such as each of the resources 306A, 306B, 306C and 306D may be provided by different cloud computing providers via different cloud environments.

In an example, the resources 306 are cloud resources that may be utilized by different users 308 in the user computing environment 302, such as via their user devices 310 and/or local resources 312 of the user computing environment 302. The local resources 312 in the user computing environment 302 of an organizational may include hardware, software, and data that are available within the premises or under direct control of the organization. The local resources 312 may be hosted on-site and they play a critical role in the day-to-day operations of the organization. Examples of the local resources may include, but are not limited to, servers, workstations, networking equipment, printers, scanners, storage devices, operating systems, enterprise applications, development tools, databases file systems, data repositories, local area network (LAN), VPN, intranet, firewalls, antivirus and anti-malware software, Email servers, Voice over Internet Protocol (VOIP) systems, messaging tools, and collaboration tools. To this end, tracking the usage of the resources 306 becomes challenging when multiple users 308 may use the same account with the cloud computing provider to access the cloud environment 304 and the resources 306. This may further contribute to a lack of visibility, accountability, and control over how the resources 306 are being utilized.

Subsequently, the system 202 provides techniques to manage the resources 306. In this regard, the system 202 is configured to monitor usage data associated with the resources 306. The usage data for the resources 306 is stored within the database 318 as usage data 314. In an example, the usage data associated with a resource may indicate that the resource is created, modified, or deleted. Such usage data may indicate a status of a change in a configuration of the resource. Subsequently, the usage data 314 may indicate configuration of each of the resources 306. For example, any change in the configuration of the resources 306 may cause an update in the usage data 314. Such an update is analyzed to identify which resource(s) has been updated. Such monitoring of the usage data may enable accurate and timely identification of any update in the resources 306 to ensure real-time or near real-time update in a service tag of the resources 306.

Further, the system 202 is configured to determine resource data associated with each of the resources 306 based on the usage data 314. For example, the system 202 may be configured to determine resource data for resource(s) that may have undergone an update, such as when their usage data is updated. Alternatively, the system 202 may be configured to determine resource data for each of the resources 306. The resource data of the resources 306 may be stored as resource data 316 in the database 318. The resource data 316 for each of the resources 306 may include precise information of the resources 306. In an example, the resource data 316 for a resource, say a compute resource from the compute resources 306A, may include, but is not limited to, status (for example, operational, or not-in-use, etc.), one or more user identifiers (such as user ID of each of one or more users accessing the compute resource for carrying out operations), user access data (such as timestamp associated with one or more users accessing the compute resource, operations executed by the compute resource, etc.), one or more resource identifiers (such as resource ID of each of one or more calling resources accessing the compute resource for carrying out operations), application programming interface (API) call data (such as timestamp and duration of access of the compute resource by the one or more calling resources), creation data (such as timestamp of creation of the compute resource), modification data (such as timestamp of an update or manipulation of a configuration of the compute resource), name data (such as a name assigned to the compute resource, a name assigned to a team accessing the compute resource, a name assigned to a service being executed by the compute resource, etc.), assigned service tag data (such as, an existing service tag assigned to the compute resource), group data (such as a group of resources to which the compute resource is mapped to, for example, based on a type, an architecture, a service, a use scenario, a provider, etc.), or hierarchy data (such as any parent and/or child resource(s) associated with the compute resource).

The system 202 may be configured to determine one or more utilization relationships for each of the resources 306 based on the resource data 316. For example, a resource from the resources 306 may have one or more utilization relationships with, for example, one or more users from the users 308, one or more user devices from the user device 310, one or more local resources from the local resources 312, and/or one or more resources from the resources 306. In particular, the one or more utilization relationships of the resource may be determined based on one or more calling entities that may be calling, i.e., accessing, the resource for carrying out certain operations. In an example, the one or more utilization relationships of the resource may indicate when and by whom the resource may be consumed or utilized. In certain cases, the one or more utilization relationships of the resource may also indicate when and by whom the resource may be consumed or utilized indirectly. To this end, the one or more utilization relationships of the resource may correspond to relationships of the resource with a user, a local resource, a user device, or another cloud device calling the resource. For example, such one or more utilization relationships of each of the resources 306 may also be stored in the database 318. Details of the determination of the one or more utilization relationships of each of the resources 306 are further described in conjunction with, for example, FIG. 4A, FIG. 4B and FIG. 5.

Based on the one or more utilization relationships and the resource data of each of the resources 306, the system 202 may be configured to generate one or more clusters. In an example, the system 202 may include a first model 320 for performing the clustering operation for the resources 306. In an example, the first model 320 may be a ML model configured to perform clustering algorithms to group similar resources based on their utilization and corresponding resource data. For example, the first model 320 may be configured to group the one or more resources from the resources 306 in a single cluster when the one or more resources are identified to be utilized by same user, user device, local resource and/or cloud resource, such as based on corresponding user ids, device ids, etc. To this end, based on the utilization relationships and resource data of each of the resources 306, the resources 306 may be grouped into the one or more clusters. In an example, the first model 320 may utilize a density-based clustering algorithm, such as DB Scan to cluster the resources 306 into the one or more clusters. Details of the clustering of the resources 306 are further described in conjunction with, for example, the FIG. 6 and FIG. 7.

Thereafter, the system 202 may be configured to determine tag data 322 for each of the resources 306. The tag data for a resource may be determined based on a cluster in which the resource is grouped. For example, a cluster may include a compute resource from the compute resources 306A, two memory resources from the storage resources 306B, and a database from the database resources 306D. In the present example, each of these resources, i.e., the compute resource, the two memory resources and the database, may have the same or similar tag data corresponding to them. The tag data for these resources may indicate a common user, team, service, etc. In this manner, all the resources that may be utilized by a single team or service in an organization may be tagged with the same service tag to ensure efficient management and tracking.

In an example, the system 202 may be configured to store the tag data 322. For example, the tag data 322 may be stored in the database 318. Based on the tag data 322 for each of the resources 306, each of the resources 306 may be tagged or labeled with a corresponding service tag. The service tag may be assigned to each of the resources 306, such that a resource identifier of each of the resources 306 may be associated with corresponding usage data, resource data, tag data, and service tag. The resource identifier of a resource with the corresponding usage data, resource data, tag data, and service tag may be stored in the database 318.

It may be noted, the usage data 314 for the resources 306 may be periodically or continuously monitored. Based on the monitoring, any change in a configuration of any of the resources 306, say resource X, may be identified. Subsequently, the usage data 314 stored in the database 318 may be updated, for example, to indicate the change associated with the resource X. Further, the system 202 may be configured to determine updated resource data for the resource X. As a result, the resource data 316 associated with the resource X may also be updated in the database 318. Thereafter, the system 202 may be configured to determine updated utilization relationships for the resource X and determine a cluster to which the resource X should be associated with or grouped in based on the utilization relationships. For example, in case of a change in the cluster of the resource X, the system 202 may be configured to determine updated tag data for the resource X. The system 202 may be configured to assign an updated service tag or a new service tag to the resource X based on the updated tag data. In this manner, the tag data 322 and/or service tag associated with each of the resources 306 may be updated to enable accurate and real-time tracking of utilization and management of the resources 306.

A manner in which the system 202 operates to perform automated tagging of the resources 306 rebased on the utilization relationships of each of the resources 306 is described in detail in conjunction with FIG. 4A, FIG. 4B, FIG. 5, FIG. 6, and FIG. 7.

FIG. 4A, FIG. 4B, FIG. 4C and FIG. 4D are diagrams that depict exemplary utilization relationships associated with resources, in accordance with various embodiments of the present disclosure. FIG. 4A, FIG. 4B, FIG. 4C and FIG. 4D are described in conjunction with elements of the FIG. 2 and FIG. 3.

A utilization relationship between a resource and its user describes how the user interacts with, consumes, and manages the resource within a computing or cloud environment. This utilization relationship may indicate resource usage patterns, such as frequency of usage, when or time of use of the resource, duration of usage, type of usage, extent of usage or how much resource is consumed by the user, modifications done to the resource, policies defined for the resource, etc.

According to the present embodiment, a user computing environment 402 may include a resource 404A, a resource 404B, a resource 404C, and a resource 404D (collectively referred to as resources 404). In an embodiment, the user computing environment 402 may be an exemplary embodiment of the user computing environment 206 of FIG. 2 or the user computing environment 302 of FIG. 3. In an embodiment, the resources 404 may be an exemplary embodiment of the resources 204 of FIG. 2 or the resources 306 of FIG. 3.

Pursuant to the embodiments of the present disclosure, one or more utilization relationships of each of the resources 404 are analyzed to determine a cluster to which they belong. The utilization relationships may link each of the resources 404 to its calling entity, such as its user(s), user device(s) accessing it or any other local or cloud resource(s) accessing it. The utilization relationships for each of the resources 404 may be determined based on the resource data 316 associated with the resources 404. For example, the system 202 may be configured to retrieve or obtain the resource data 316 from one or more databases associated with the resources 404, a cloud environment providing the resources 404, and/or one or more user accounts used to access the resources 404. The resource data 316 may include data associated with user activity for each of the resources 404 as well as other. In an example, the system 202 may be configured to access monitoring services and tools to retrieve the resource data 316 and determine or identify utilization relationships and networking details, such as API calls for each of the resources 404.

Figure 4A:
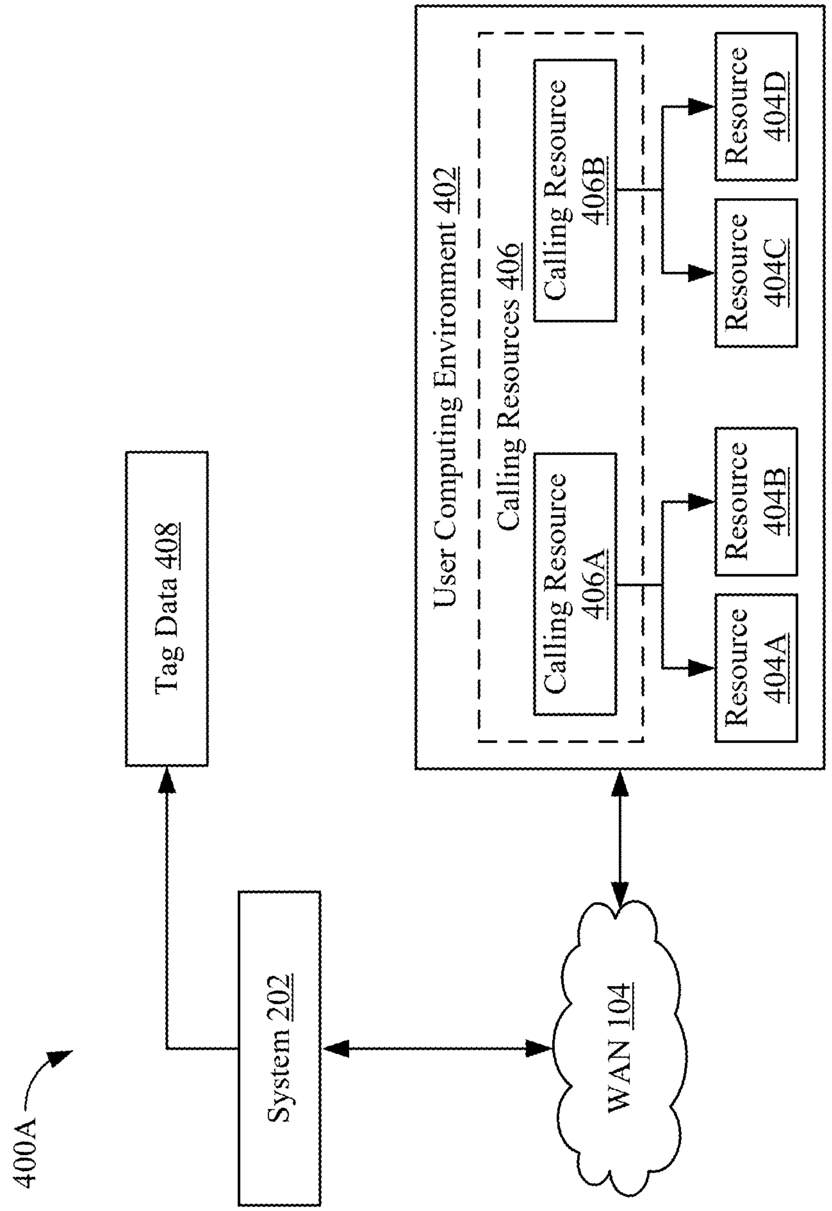
FIG. 4A, FIG. 4B, FIG. 4C and FIG. 4D are diagrams that depict exemplary utilization relationships associated with resources, in accordance with various embodiments of the disclosure.

FIG. 4A depicts an illustration 400A of exemplary utilization relationships associated with the resources 404, in accordance with an embodiment of the disclosure. The system 202 is configured to determine utilization relationships for each of the resources 404. Pursuant to the present example, the resources 404 may be accessed by same or different calling entities. Specifically, the type of utilization relationships according to the present example may correspond to utilization relationships between the resources 404 and one or more calling resources, depicted as a calling resource 406A and a calling resource 406B (collectively referred to as calling resources 406). The calling resources 406 may be hardware, firmware or software computing resources that may access and/or call the resources 404. In an example, the calling resources 406 may call and/or access the resources 404 via API call. In an example, the calling resources 406 may be local resources, such as local resources 312 of a user computing environment, or cloud resources. While the present example described calling resources 406 as different resources from the resources 404, however, in some cases, a calling resource of a resource, say the resource 404A, may be another resource, say the resource 404C, from the same pool of the resources 404.

In an embodiment, the calling resource 406A may call or access the resources 404A and 404B, while the calling resource 406B may call or access the resources 404C and 404D. In an example, the resource data associated with the resources 404A and 404B may indicate use, modification, or user activity for the resources 404A and 404B to be performed through the calling resource 406A. Subsequently, a utilization relationship for the resource 404A may correspond to a relationship between the resource 404A and the calling resource 406A, and a utilization relationship for the resource 404B may correspond to a relationship between the resource 404B and the calling resource 406A. Similarly, a utilization relationship for the resource 404C may correspond to a relationship between the resource 404C and the calling resource 406B, and a utilization relationship for the resource 404D may correspond to a relationship between the resource 404D and the calling resource 406B. These utilization relationships may correspond to resource-to-resource relationships. It may be noted that such utilization relationships of the resources 404 are only exemplary and should not be construed as a limitation.

Continuing further, since the resources 404A and 404B are associated with the same calling resource 406A, the resources 404A and 404B may be grouped into one cluster. On the other hand, since the resources 404C and 404D are associated with the same calling resource 406B, the resources 404C and 404D may be grouped into another cluster. The system 202 may be configured to determine tag data 408 for each of the resources 404 based on the corresponding clusters. As the resources 404A and 404B are a part of the same cluster, the tag data for the resources 404A and 404B may be the same or similar. Subsequently, the same or similar service tag may be assigned to each of the resources 404A and 404B. Further, as the resources 404C and 404D are a part of the same cluster, the tag data for the resources 404C and 404D may be the same or similar. Subsequently, the same or similar service tag may be assigned to each of the resources 404C and 404D.

Figure 4B:
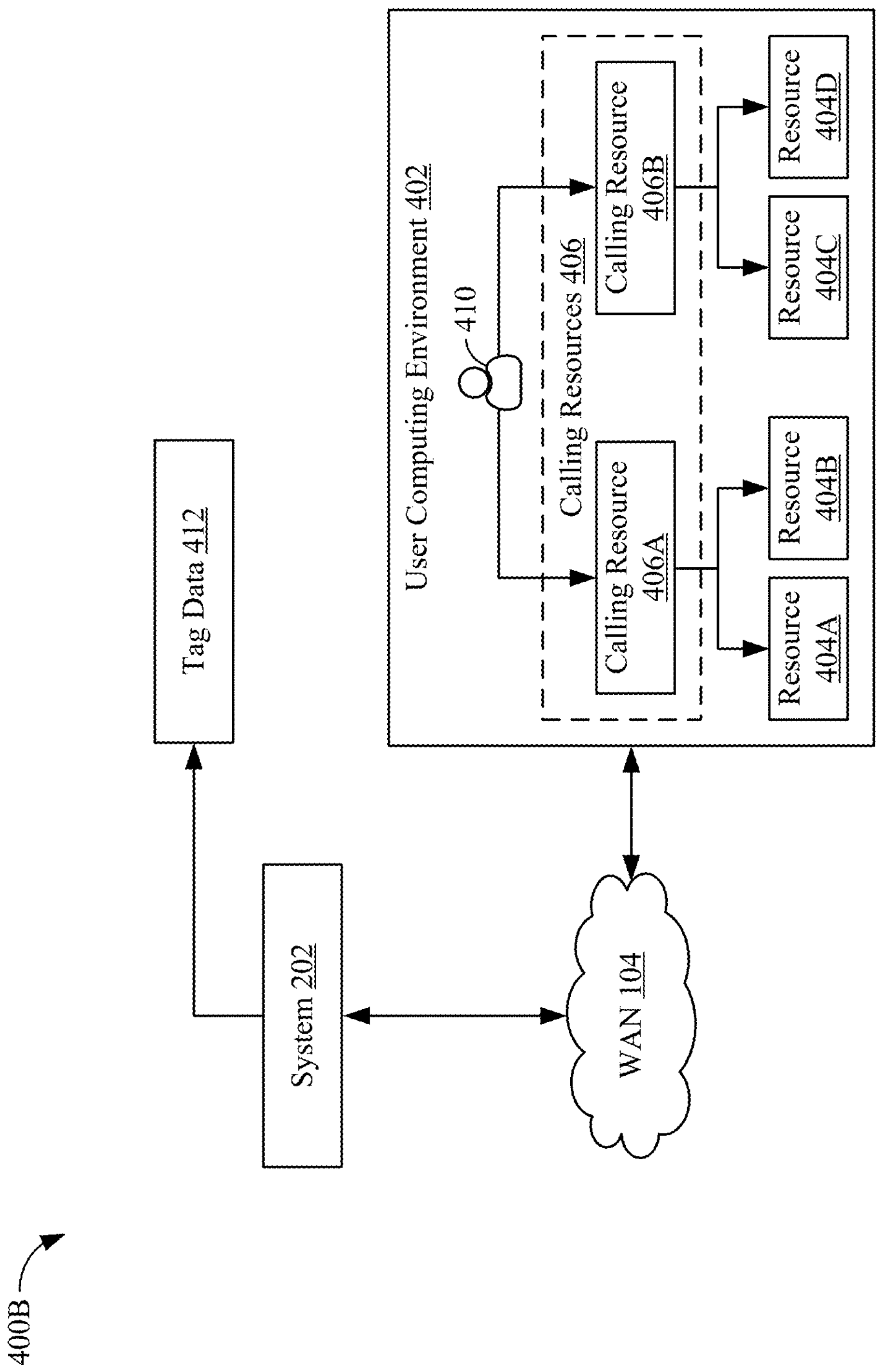

FIG. 4B depicts an illustration 400B of exemplary utilization relationships associated with the resources 404, in accordance with an embodiment of the disclosure. The system 202 may be configured to determine utilization relationships for each of the resources 404. Pursuant to the present example, the resources 404A and 440B may be accessed or called by the same calling resource 406A, while the resources 404C and 404D may be accessed or called by the calling resource 406B. In this regard, based only on utilization relationships between the calling resources 406 and the resources 404, the resources 404A and 404B may be grouped in one cluster, and the resources 404C and 404D may be grouped in another cluster. However, there exists another utilization relationship between the calling resources 406A and 406B, such as being accessed by the same user 410. To this end, all of the resources 404 may be grouped in one cluster to indicate a common calling entity, e.g., the user 410.

In this manner, each of the resources 404 may be grouped in one cluster owing to the same or common calling entity, e.g., the user 410. In this regard, tag data 412 for each of the resources 404 may be same or similar. As a result, the same service tag may be assigned to each of the resources 404.

In certain cases, while each of the resources 404 may be accessed by the same user 410, however, the resources 404A and 404B may be associated with one service, product or application, and the resources 404C and 404D may be associated with another service, product, or application. In an example, the system 202 may be configured to determined services based on the resource data associated with the resources 404. In this case, the resources 404A and 404B may be grouped in a cluster separate from a cluster in which the resources 404C and 404D are grouped. Subsequently, different service tags may be assigned to the resources 404A and 404B from the resources 404C and 404D, such that the service tags are indicative of the different services for which the resources 404 are utilized.

Figure 4C:
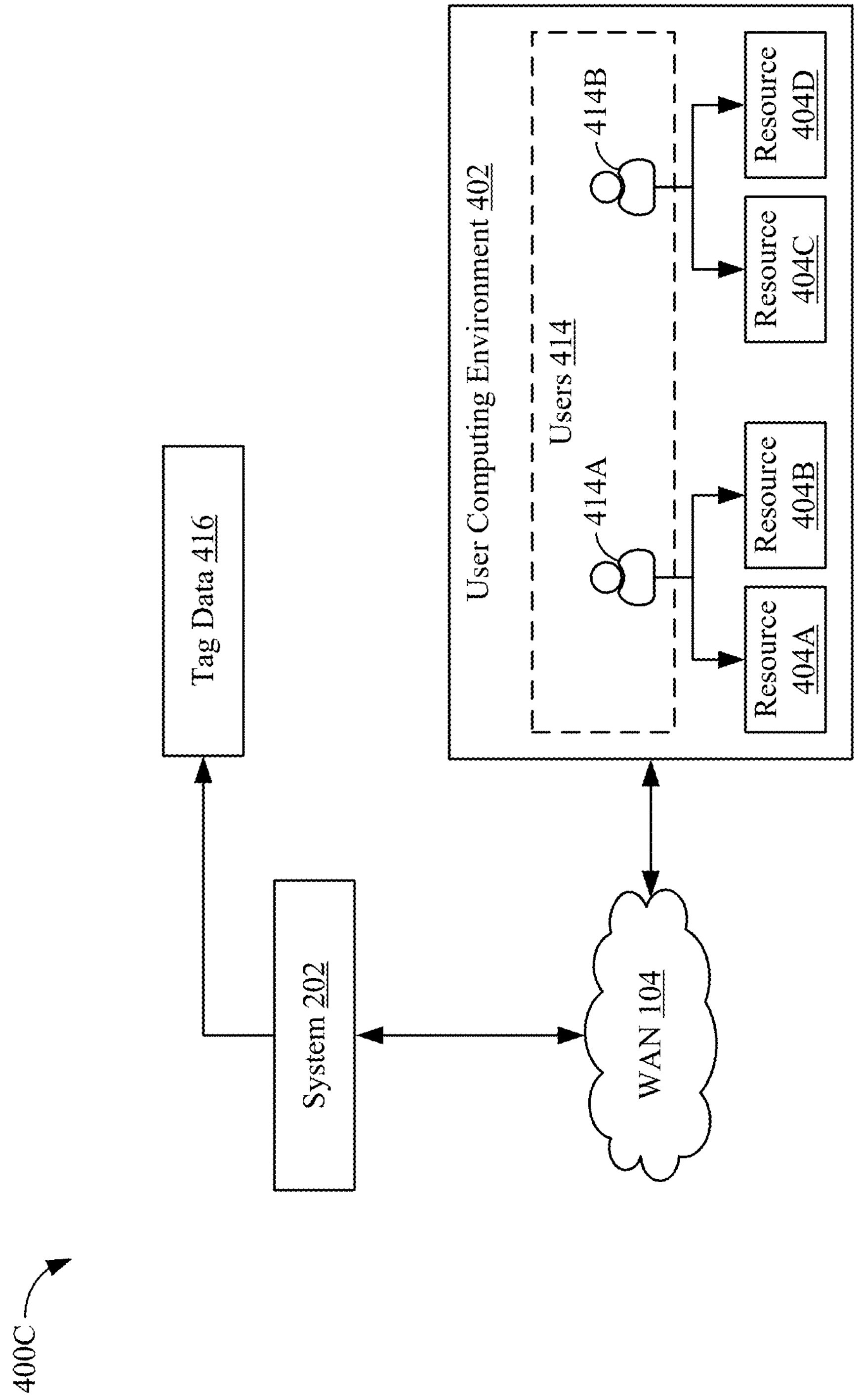

FIG. 4C depicts an illustration 400C of exemplary utilization relationships associated with the resources 404, in accordance with an embodiment of the disclosure. The system 202 is configured to determine utilization relationships for each of the resources 404.

Pursuant to the present example, the resources 404 may be accessed by same or different calling entities. Specifically, the utilization relationships according to the present example may correspond to utilization relationships between the resources 404 and one or more users, depicted as a user 414A and a user 414B (collectively referred to as users 414). The users 414 may be users within the user computing environment 402 of an organization or an enterprise. The users 414 may directly use the resources 404 for specific tasks. For example, the users 414 may be developers and the resources 404 may be virtual machines. In such a case, the users 414 may directly use the resources 404 for software development and testing.

Based on the direct association of the resources 404 with the users 414, the utilization relationships may correspond to resource-to-user relationships. In an example, the users 414 may access the resources 404, for example, to create a resource, utilize a resource, and/or modify (such as, change name, update sizing, etc.) a resource.

The system 202 is further configured to determine tag data 416 for each of the resources 404. In an example, the tag data 416 associated with the resources 404A and 404B may be same or similar owing to a common calling entity, i.e., the user 414A. Similarly, the tag data 416 associated with the resources 404C and 404D may be same or similar owing to a common calling entity, e.g., the user 414B. Accordingly, the same or similar service tag may be assigned to the resources 404A and 404B, and another same or similar service tag may be assigned to the resources 404C and 404D.

Figure 4D:
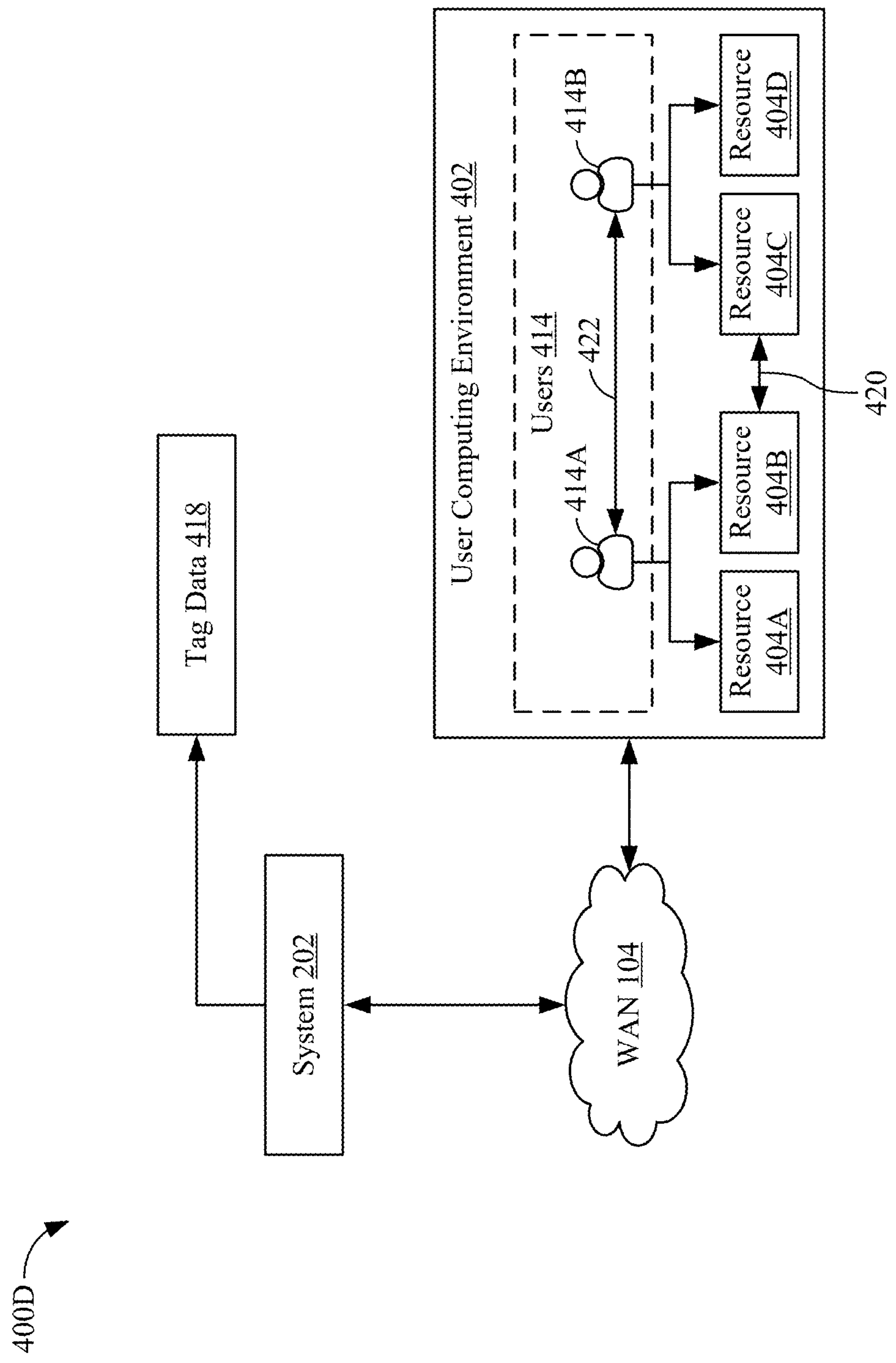

FIG. 4D depicts an illustration 400D of exemplary utilization relationships associated with the resources 404, in accordance with an embodiment of the disclosure. The system 202 is configured to determine utilization relationships for each of the resources 404. Pursuant to the present example, the resources 404 may be accessed by same or different calling entities. Specifically, the utilization relationships according to the present example may correspond to utilization relationships between the resources 404 and the users 414. The users 414 may directly use the resources 404 for specific tasks. For example, the user 414A may access the resources 404A and 404B, while the user 414B may access the resources 404C and 404D.

In addition to the resource-to-user utilization relationships for the resources 404, another utilization relationship 420 may exist between the resource 404B and the resource 404C. For example, the utilization relationship 420 is a resource-to-resource relationship that may indicate that, for example, the resource 404C is accessed or called by the resources 404B, such as through an API call.

Owing to multi-fold relationship between the resources 404 and the users 414, user-to-user relationships may be identified within the user computing environment 402. For example, a user-to-user utilization relationship 422 may be an indirect utilization relationship between the users 414. The user-to-user utilization relationship 422 may be determined based on monitoring the resources that the users 414 utilize as well as by monitoring the repetitive pattern of utilizing and/or modifying common resources in the user computing environment 402. The common resources may be common or shared amongst one or more users 414 in the user computing environment 402.

Based on the indirect association of the resources 404 with the users 414 and amongst themselves, the user-to-user utilization relationship 422 may be formed. In an example, the users 414 may access the resources 404, for example, to create a resource, utilize a resource, and/or modify (such as, change name, update sizing, etc.) a resource.

The system 202 is further configured to determine tag data 418 for each of the resources 404. In an example, the tag data 418 associated with the resources 404 may be same or similar owing to an association between the corresponding calling entities, e.g., the user 414A and the user 414B. Accordingly, the same or similar service tag may be assigned to the resources 404.

According to an embodiment, a resource from the resources 404 may be a cloud database instance, e.g., a database resource. The resource may be uniquely identified by corresponding resource ID, such as db-45678. Further, the resource may be accessed or utilized by a user. The user may be uniquely identified based on, for example, a name "ABC," and/or a user ID "user-112233". Thereafter, the system 202 may be configured to monitor interactions of the user and/or other users in a user computing environment with the resource. Based on resource data of the resource indicating that it is being accessed by the user, a utilization relationship, such as a resource-to-user utilization relationship may be determined between the resource and the user. Thereafter, the resource along with other resources that may be associated with the user and/or the resource may be grouped together in a cluster indicating an interdependency or link in utilization. For each of the resources in the cluster, the system 202 is configured to determine tag data. In an example, the tag data may be a key value pair having information associated with, for example, user ID, username, project details, team name, service name, etc. In certain cases, the tag data may include additional annotations for the resource, such as utilization duration, utilization extent, etc. Based on the tag data, the system 202 may be configured to assign a service tag to the resource. In this regard, the service tag may have a format of, for example, {"user": "username", "project": "team", "department": "type of usage"}. The values for any one or more than one of these fields may be used to assign the service tag to the resource. In an example, the service tag may be based on the user ID. In another example, the service tag may be based on the service or application that may be developed using the resource. In yet another example, the service tag may be based on the team that may be using the resource.

Figure 5:
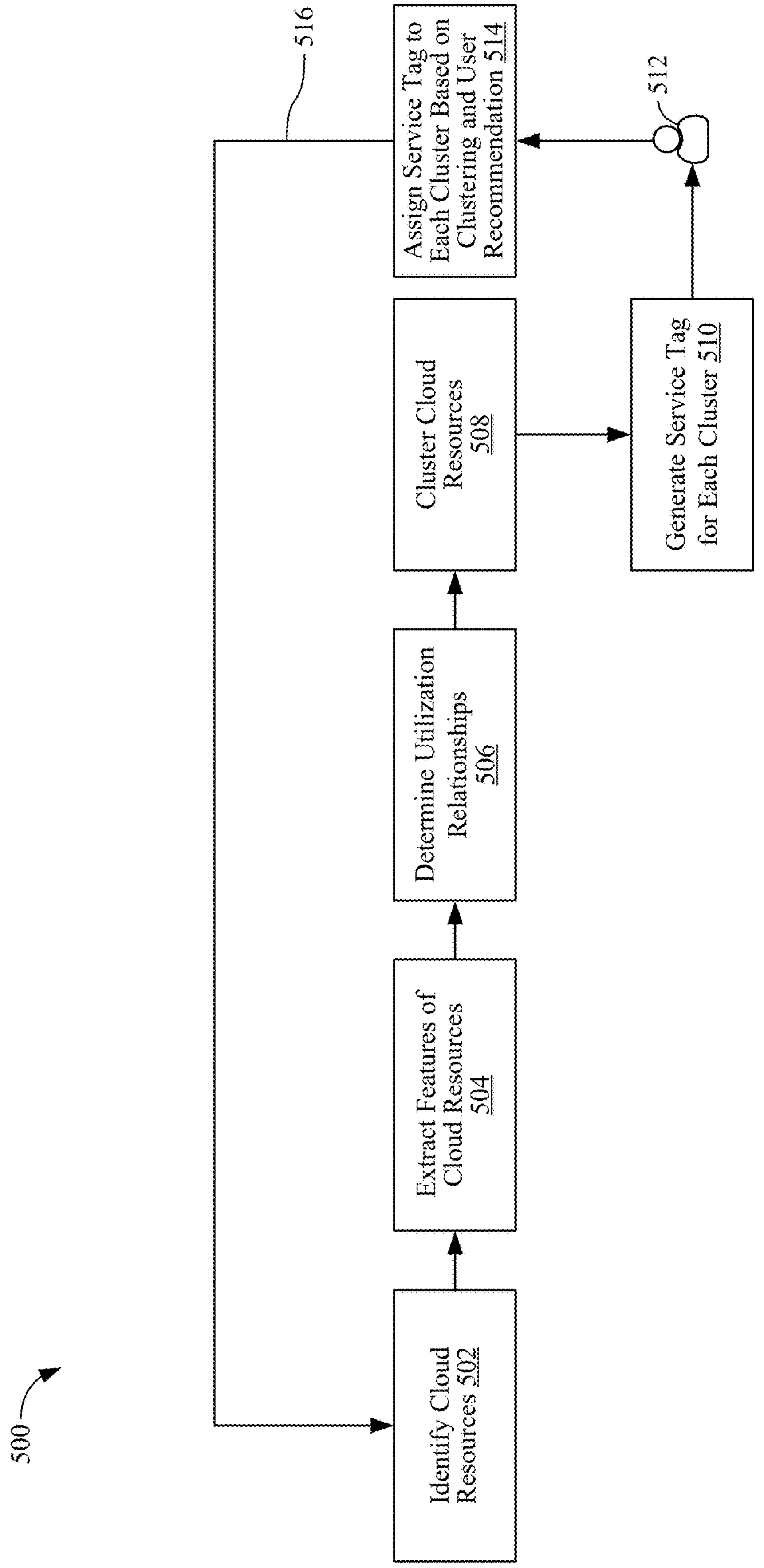
FIG. 5 illustrates a block diagram of an exemplary method for generating tag data for resources, in accordance with some example embodiments of the present disclosure.

FIG. 5 illustrates a block diagram 500 of an exemplary method for generating tag data for resources, in accordance with an example embodiment of the present disclosure. In an example, the steps of the method may be implemented by the system 202. FIG. 5 is described in conjunction with elements of the FIG. 2, FIG. 3, FIG. 4A, FIG. 4B, FIG. 4C and FIG. 4D.

At 502, cloud resources are identified. In an example, the system 202 is configured to identify the cloud resources, such as the resources 204, the resources 306 and the resources 404. The cloud resources utilized in the user computing environment may be identified, for example, based on information of user accounts that may be created and operated with the cloud environment 304. In an example, the cloud resources may be identified based on the usage data 314 of the cloud resources.

At 504, features of the cloud resources are extracted. The system 202 may be configured to determine or extract the features of the resources as the resource data 316. The features of the resources or the resource data 316 may be extracted from databases associated with cloud account(s) and/or databases of the resources.

Once the cloud resources are identified and its features are extracted from the cloud environment 304, at 506, utilization relationships are determined. The system 202 may be configured to compute utilization relationships for each of the cloud resources. The utilization relationships may indicate a set of attributes that uniquely define each of the resources based on resource-to-resource relationships, resource-to-user relationships, user-to-user relationships, or a combination thereof.

At 508, cloud resources are clustered. The system 202 may be configured to generate a plurality of datapoints corresponding to the plurality of resources. Further, the plurality of datapoints may be clustered based on the one or more utilization relationships and the resource data of the resources of the user computing environment. Each cluster may correspond to a subset of the plurality of resources based on its utilization relationships. For example, each subset may include a subset of the plurality of datapoints associated with the same calling entity.

In an example, the system 202 may be configured to utilize the first model 320 to perform clustering of the plurality of resources. Clustering may involve grouping a set of objects in such a way that objects in the same group (called a cluster) are more similar to each other than to those in other groups (i.e., clusters).

According to the present disclosure, the first model 320 may be implemented based on Hierarchical Clustering algorithm (e.g., HCA) or a density-based clustering algorithm (e.g., DBSCAN). The first model 320 may be used to identify the clusters in the plurality of datapoints that may map to the utilization relationships of the cloud resources. For example, the clustering algorithm or the first model 320 may be trained based on previously identified utilization relationships and their corresponding tags. After the training, the first model 320 may be configured to output groupings or clusters of the cloud resources that may be identified as being closely related, based on the utilization relationships.

In an example, the first model 320 may be based on DBSCAN clustering algorithm. As may be noted, the DBSCAN clustering algorithm is a density-based clustering algorithm that is particularly well-suited for identifying clusters of arbitrary shape and handling noise. DBSCAN may not require an input associated with a number of clusters to be specified beforehand. In an example, the density-based clustering of the DBSCAN clustering algorithm relies on the concept of density to form clusters. The first model 320 of the DBSCAN clustering model may identify regions with high density (e.g., many data points) in an embedding space, such as a multi-dimensional space, as clusters and regions with low density (few data points) as noise or outliers.

In another example, the first model 320 may be based on a hierarchical clustering algorithm. The hierarchical clustering is a type of clustering algorithm that seeks to build a hierarchy of clusters. The hierarchical clustering algorithm may be broadly categorized into two types, such as agglomerative (bottom-up) and divisive (top-down). Hierarchical clustering is particularly useful when the dataset exhibits a nested structure, and the goal is to understand the levels of data grouping at different scales. For example, during initialization, the first model 320 or the hierarchical clustering algorithm may treat each data point as a single cluster (n clusters for n data points). Thereafter, the first model 320 may be configured to calculate the distance between every pair of clusters using a chosen distance metric. The first model 320 may then be configured to identify two closest clusters based on the linkage criterion and merge them. Based on the merging, the clusters of the plurality of datapoints corresponding to the plurality of resources may be generated.

At 510, tag data is generated for the clustered cloud resources. In particular, the plurality of datapoints corresponding to the plurality of resources are grouped into one or more clusters based on similarities in utilization relationships of the plurality of resources. The tag data for a cluster may include indication of, for example, user identifier, username, service, type of usage, team, or a combination thereof.

At 512, the tag data is verified. In an example, the system 202 may be configured to output the tag data for verification thereof by a user. The user may be, for example, an IT administrator, a user of the resources, a system administrator, etc.

In an example, the verification of the tag data may include overwriting the tag data by the user. For example, the user may overwrite the tag data based on identifying that the tag data is not relevant for the clustered cloud resources or fails to effectively classify the clustered cloud resources based on users using them. In such a case, a recommendation of tag data provided by the user may be used to update the tag data and, for example, train an ML model for tag data generation.

At 514, a service tag is assigned to each of the clusters based on the clustering, corresponding tag data and user recommendation. In an example, by using the first model 320 or the clustering algorithm, the system 202 is configured to automatically add a service tag to each of the clusters or resource groups identified. Specifically, a service tag is assigned to each of the resources, wherein resources in a group or a cluster may have the same service tags. The clustering or the groupings are reflected in the cloud platform and the need for users to manually tag them is eliminated.

At 516, the method or process for generating tag data loops back from 514 to 502. In an example, the operation of 502 may be performed again, such as after a predefined time interval. In this regard, the process of identifying a resource, such as a new resource or an updated resource may be performed again after the predefined time interval. Such monitoring may enable to identify any change or update in existing resources as well as any addition or deletion of resources. For example, the system 202 may be configured to monitor the usage data of the resources to detect a change in the usage data of a resource of the plurality of resources. Further, the system 202 may be configured to determine updated tag data associated with the resource based on the change. In an example, the predefined time interval may be 5 minutes 15 minutes 30 minutes 2 hours, 5 hours, etc. Subsequently, the tag data for the resources is continuously updated to provide accurate tagging of the cloud resources.

Figure 6:
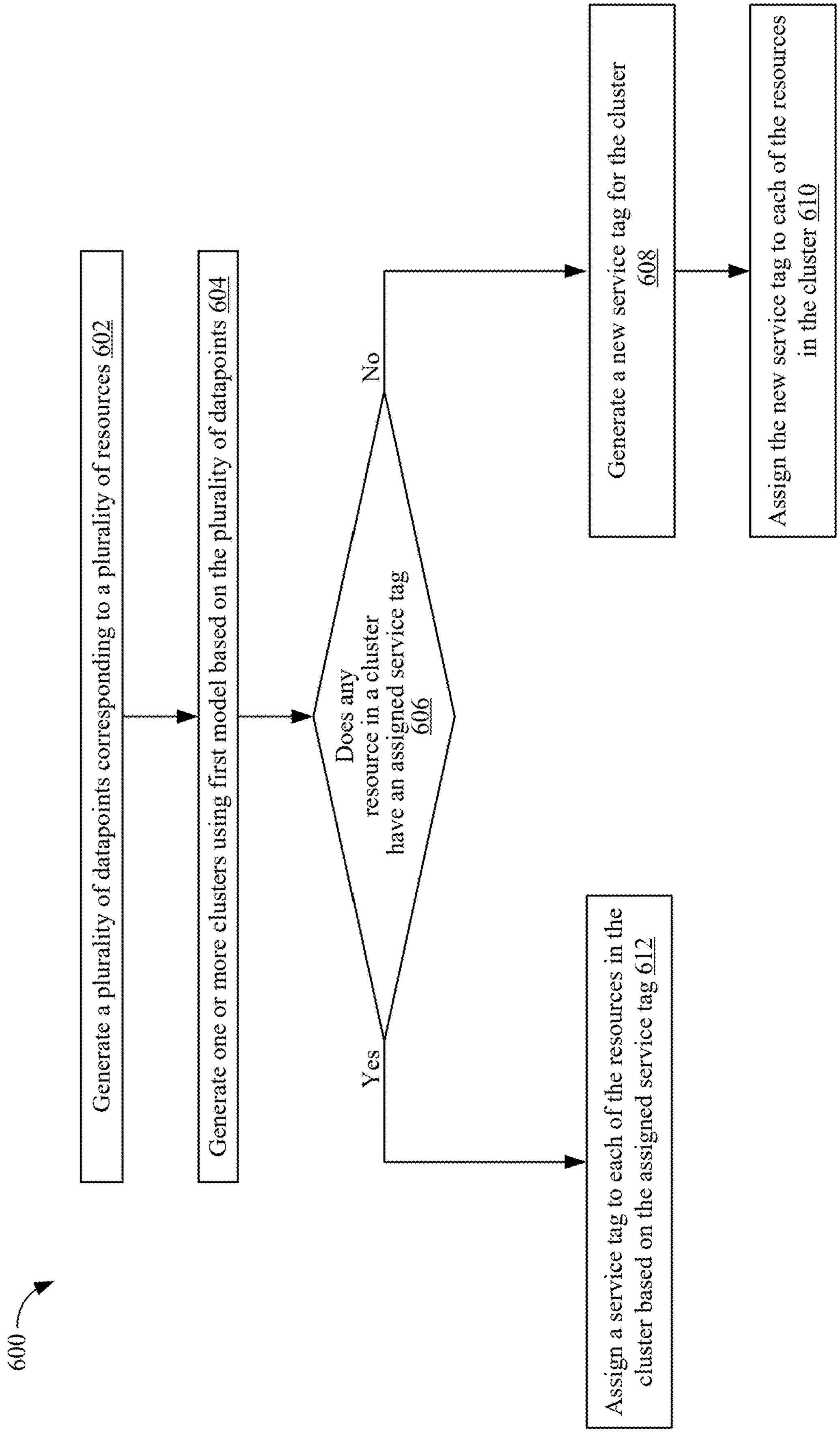
FIG. 6 illustrates a flowchart of an exemplary method for assigning service tags to the resources, in accordance with some example embodiments of the present disclosure.

FIG. 6 is a flowchart 600 that illustrates an exemplary method for assigning service tags to cloud resources, in accordance with an example embodiment of the present disclosure. The FIG. 6 is explained in conjunction with FIG. 2, FIG. 3, FIG. 4A, FIG. 4B, FIG. 4C, FIG. 4D and FIG. 5.

At 602, a plurality of datapoints is generated corresponding to a plurality of resources. In an example, the system 202 may be configured to generate the plurality of datapoints corresponding to the resources 204, the resources 306 or the resources 404. For example, the system 202 is configured to generate the plurality of datapoints based on the one or more utilization relationships and the resource data 316.

In certain cases, the system 202 may utilize the first model 320 to generate the plurality of datapoints. For example, the system 202 may be configured to generate a multi-dimensional embedding for each of the plurality of resources based on the one or more utilization relationships and the resource data. Such multi-dimensional embedding of a resource may correspond to a datapoint of the resource in a multi-dimensional space. For example, the multi-dimensional embedding technique may be used by the first model 320 to represent high-dimensional data, i.e., the resource data 316 and the utilization relationships of the resources, in a lower-dimensional space. In an example, the first model 320 may utilize principal component analysis (PCA), t-Distributed Stochastic Neighbor Embedding (t-SNE), Uniform Manifold Approximation and Projection (UMAP), or autoencoders to generate the embeddings of the resources to produce the plurality of datapoints corresponding to the resources.

At 604, one or more clusters are generated using the first model 320 based on the plurality of datapoints. In this regard, the first model 320 is configured to partition the plurality of datapoints into the one or more clusters. In certain cases, the one or more clusters may be generated based on features of the multi-dimensional embedding for each of the plurality of resources. For example, the first model 320 is configured to group a set of datapoints or multi-dimensional embeddings in such a way that datapoints or embeddings in the same group (or cluster) are more similar to each other than to those in other groups. In an example, the first model 320 may be based on DBSCAN that performs a density-based clustering that forms clusters based on the density of points in a region. In another example, the first model 320 may be based on hierarchical clustering algorithm that builds a tree-like structure (dendrogram) representing nested clusters. In yet another example, the first model 320 may be based on k-means clustering algorithm that partitions where the dataset is divided into k clusters.

At 606, a determination is made that does any resource in a cluster have an assigned service tag. In an example, the system 202 may be configured to analyze resource data associated with resources of each of the datapoints that may lie within the cluster. Based on the analysis, the system 202 may be configured to identify whether any one of the resources in the cluster have an existing assigned service tag or not.

In certain cases, resource data for a resource may indicate an old service tag, such that the old service tag may be outdated and may not be valid anymore. In such a case, the old service tag may be associated with usage data and/or resource data that may have led to the generation of the old service tag. Alternatively, or in addition, the old service tag may be associated with a timestamp at which it was generated. Based on a comparison between the timestamp and a current time period, the usage data and current usage data, or the resource data and current resource data, the old service tag may be identified as outdated or not valid anymore. The system 202 may be configured to check for assigned service tag for the resource in the cluster when the assigned service tag is valid for current configuration and attributes of the resource.

If there are no assigned service tags for any of the resource(s) in a cluster and/or any old service tag of any resource in the cluster is not valid anymore, the method may move to 608. At 608, the system 202 may be configured to generate a new service tag for the cluster. For example, the new service tag may indicate a calling entity, a service, a team, etc. that may be associated with the cluster.

At 610, the new service tag may be assigned to each of the resources in the cluster.

Alternatively, if the assigned service tag is present for any of the resource(s) in the cluster and the assigned service tag is still valid, the method may move to 612. At 612, the assigned service tag is assigned to each of the resources in the cluster based on the assigned service tag identified for the resource. In this regard, the system 202 may be configured to determine the tag data for each of one or more remaining resources of the resources of the cluster based on the assigned service tag. For example, if the assigned service tag indicates a team or a service associated with a resource, the tag data determined for the remaining resources in the cluster may include the same team or the same service for tagging the remaining resources.

To this end, the system 202 may be configured to assign a service tag to each of the plurality of resources based on the corresponding tag data. For example, the resources in the cluster may be assigned the same service tag for ease of retrieval and access. The service tag may be assigned based on at least one field or value that is common for all the resources in a cluster.

The operations of 602, 604, 606, 608, 610 and 612 may be repeated until the resources in each of the different clusters are tagged with corresponding tag data.

Figure 7:
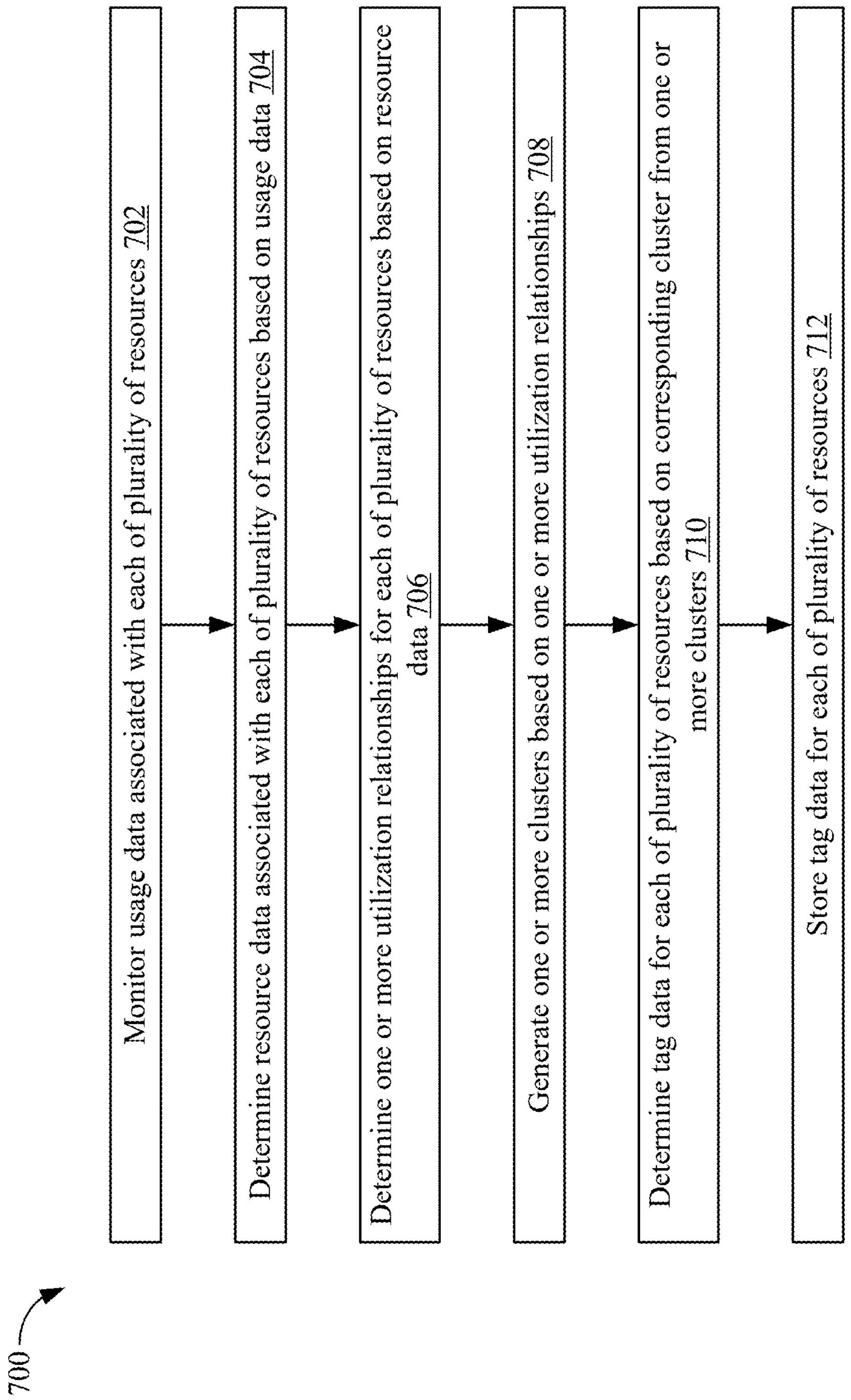
FIG. 7 illustrates a flowchart of an exemplary method for automated tagging of resources, in accordance with an embodiment of the disclosure.

FIG. 7 illustrates a flowchart 700 of an exemplary method for automated tagging of resources, in accordance with an embodiment of the disclosure. FIG. 7 is explained in conjunction with is explained in conjunction with FIG. 2, FIG. 3, FIG. 4A, FIG. 4B, FIG. 4C, FIG. 4D, FIG. 5 and FIG. 6.

At 702, usage data associated with each of a plurality of resources is monitored. In an example, the system 202 is configured to monitor the usage data 314 associated with each of the resources 306. The usage data is monitored to identify or detect any modifications, update, or deletion in a configuration of the existing resources 306, and/or detect a creation of new resource instances.

At 704, resource data associated with each of the plurality of resources is determined based on the usage data. In an example, the system 202 is configured to determine the resource data 316 associated with each of the plurality of resources 306 based on the usage data 314. The system 202 may retrieve or extract features of each of the resources 306 as the resource data 316. In an example, the resource data 316 may include, but are not limited to, one or more user identifiers, user access data, one or more resource identifiers, Application programming interface (API) call data, creation data, modification data, name data, assigned service tag data, group data, hierarchy data, or a combination thereof.

At 706, one or more utilization relationships for each of the plurality of resources are determined based on the resource data. In an example, the system 202 is configured to determine the one or more utilization relationships for each of the resources 306 based on the corresponding resource data 316. The utilization relationships may indicate a manner in which the resources are utilized by corresponding calling or accessing entity. The calling entity may be a calling resource, such as the calling resources 406, or a user, such as the users 414. It may be noted that the calling resources 406 may be local resources or devices, or cloud resources associated with the cloud environment 304. Details of the utilization relationships are described in conjunction with, for example, FIG. 4A, FIG. 4B, FIG. 4C and FIG. 4D.

At 708, one or more clusters are generated based on the one or more utilization relationships and the resource data, wherein each of the one or more clusters comprises at least one resource of the plurality of resources. In an example, the system 202 is configured to generate the one or more clusters based on the one or more utilization relationships, wherein each of the one or more clusters comprises at least one resource of the plurality of resources. The one or more clusters may partition the resources 306 or datapoints corresponding to the resources 306 into different groups. For example, each of the one or more clusters comprises at least one resource of the plurality of resources. Moreover, each of the cluster may group resources that may have similar or same utilization relationships, i.e., utilization relationships with same or similar calling entity. Details of clustering the resources or datapoints are described in detail in conjunction with, for example, FIG. 5.

At 710, tag data for each of the plurality of resources 306 is determined based on a corresponding cluster from the one or more clusters. In an example, the system 202 is configured to determine the tag data 322 for each of the plurality of resources based on a corresponding cluster from the one or more clusters. Further, resources within a cluster may have the same or similar tag data corresponding thereto. Details of determining the tag data are described in conjunction with, for example, FIG. 6.

At 712, the tag data for each of the plurality of resources 306 is stored. In an example, the system 202 is configured to store the tag data for each of the plurality of resources 306. In an example, the tag data for a resource is stored in association with usage data, resource data, and/or any other data generated during the automated tagging process associated with the resource. The tag data may be stored within the database 318. The tag data for each of the resources 306 may be utilized to assign a service tag to each of the resources 306.

Various embodiments of the disclosure may provide a non-transitory computer readable medium and/or storage medium having stored thereon, instructions executable by a machine and/or a computer to operate a system (e.g., the system 202) for automated resource tagging based on one or more utilization relationships. The instructions may cause the machine and/or computer to perform operations that include monitoring the usage data 314 associated with each of a plurality of resources 306. The operations further include determining resource data 316 associated with each of the plurality of resources 306 based on the usage data 314. The operations further include determining one or more utilization relationships for each of the plurality of resources 306 based on the resource data 316. The operations further include generating one or more clusters based on the one or more utilization relationships, wherein each of the one or more clusters comprises at least one resource of the plurality of resources 306. The operations further include determining tag data for each of the plurality of resources 306 based on a corresponding cluster from the one or more clusters. The operations further include storing the tag data for each of the plurality of resources 306.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

monitoring, by a computer, usage data associated with each of a plurality of resources;

determining, by the computer, resource data associated with each of the plurality of resources based on the usage data;

determining, by the computer, one or more utilization relationships for each of the plurality of resources based on the resource data;

generating, by the computer, one or more clusters based on the one or more utilization relationships and the resource data, wherein each of the one or more clusters comprises at least one resource of the plurality of resources;

determining, by the computer, tag data for each of the plurality of resources based on a corresponding cluster from the one or more clusters;

storing, by the computer, the tag data for each of the plurality of resources;

detecting, by the computer, a change in the usage data of a first resource of the plurality of resources based on the monitoring; and determining, by the computer, updated tag data associated with the first resource based on the change.

2. The computer-implemented method of claim 1, wherein the usage data of each of the plurality of resources comprises information associated with at least one of creation of each of the plurality of resources, modification of each of the plurality of resources, or deletion of each of the plurality of resources.

3. The computer-implemented method of claim 1, further comprising assigning by the computer, a service tag to each of the plurality of resources based on the corresponding tag data of each of the plurality of resources.

4. The computer-implemented method of claim 1, further comprising:

determining, by the computer, the one or more utilization relationships for a second resource from the plurality of resources based on a utilization of the second resource by a calling entity, and wherein the calling entity is at least one of a calling resource or a user.

5. The computer-implemented method of claim 1, further comprising:

generating, by the computer, a plurality of datapoints corresponding to the plurality of resources based on the one or more utilization relationships and the resource data; and generating, by the computer, the one or more clusters using a first model, wherein the first model is configured to partition the plurality of datapoints into the one or more clusters.

6. The computer-implemented method of claim 1, further comprising:

generating, by the computer, a multi-dimensional embedding for each of the plurality of resources based on the one or more utilization relationships and the resource data; and generating, by the computer, the one or more clusters based on features of the multi-dimensional embedding for each of the plurality of resources.

7. The computer-implemented method of claim 1, further comprising:

determining, by the computer, an assigned service tag of the at least one resource of the plurality of resources in a cluster of the one or more clusters based on the resource data; and determining, by the computer, the tag data for each of one or more remaining resources of the plurality of resources of the cluster based on the assigned service tag.

8. The computer-implemented method of claim 1, wherein the resource data is selected from the group consisting of one or more user identifiers, user access data, one or more resource identifiers, application programminginterface (API) call data, creation data, modification data, name data, assigned service tag data, group data, and hierarchy data.

9. The computer-implemented method of claim 1, wherein each of the plurality of resources is a cloud resource, and wherein the plurality of resources is selected from the group consisting of a compute resource, a storage resource, a networking resource, and a database resource.

10. A system, comprising:

a processor set configured to:

monitor usage data associated with each of a plurality of resources;

determine resource data associated with each of the plurality of resources based on the usage data;

determine one or more utilization relationships for each of the plurality of resources based on a utilization of each of the plurality of resources by a calling entity, and wherein the calling entity is at least one of a calling resource or a user;

generate one or more clusters based on the one or more utilization relationships and the resource data, wherein each of the one or more clusters comprises at least one resource of the plurality of resources;

determine tag data for each of the plurality of resources based on a corresponding cluster from the one or more clusters;

store the tag data for each of the plurality of resources;

detect a change in the usage data of a resource of the plurality of resources based on the monitored usage data; and determine updated tag data associated with the resource based on the change.

11. The system of claim 10, wherein the usage data of each of the plurality of resources comprises information associated with at least one of creation of each of the plurality of resources, modification of each of the plurality of resources, or deletion of each of the plurality of resources.

12. The system of claim 10, wherein the processor set is further configured to assign a service tag to each of the plurality of resources based on the corresponding tag data of each of the plurality of resources.

13. The system of claim 10, wherein the processor set is further configured to:

generate a plurality of datapoints corresponding to the plurality of resources based on the one or more utilization relationships and the resource data; and generate the one or more clusters using a first model, wherein the first model is configured to partition the plurality of datapoints into the one or more clusters.

14. The system of claim 10, wherein the processor set is further configured to:

generate a multi-dimensional embeddingfor each of the plurality of resources based on the one or more utilization relationships and the resource data; and generate the one or more clusters based on features of the multi-dimensional embedding for each of the plurality of resources.

15. The system of claim 10, wherein the processor set is further configured to:

determine an assigned service tag of the at least one resource of the plurality of resources in a cluster of the one or more clusters based on the resource data; and determine the tag data for each of one or more remaining resources of the plurality of resources of the cluster based on the assigned service tag.

16. The system of claim 10, wherein the resource data is selected from the group consisting of one or more user identifiers, user access data, one or more resource identifiers, application programming interface (API) call data, creation data, modification data, name data, assigned service tag data, group data, and hierarchy data.

17. The system of claim 10, wherein each of the plurality of resources is a cloud resource, and wherein the plurality of resources is selected from the group consisting of: a compute resource, a storage resource, a networking resource, a database resource, and a software application.

18. A computer program product for tagging of resources, the computer program product comprising a computer-readable storage medium having program instructions embodied therewith, the program instructions executable by a processor set to cause the processor set to:

monitor usage data associated with each of a plurality of resources;

determine resource data associated with each of the plurality of resources based on the usage data;

determine one or more utilization relationships for each of the plurality of resources based on a utilization of each of the plurality of resources by a calling entity, and wherein the calling entity is at least one of: a calling resource, or a user;

generate one or more clusters based on the one or more utilization relationships and the resource data, wherein each of the one or more clusters comprises at least one resource of the plurality of resources;

store tag data for each of the plurality of resources, wherein the tag data for each of the plurality of resources is determined based on a corresponding cluster from the one or more clusters;

detect a change in the usage data of a resource of the plurality of resources based on the monitored usage data; and determine updated tag data associated with the resource based on the change.

* * * * *